(12) United States Patent
Vrazel

(10) Patent No.: US 11,588,610 B2
(45) Date of Patent: Feb. 21, 2023

(54) DATA TRANSITION TRACKING FOR RECEIVED DATA

(71) Applicant: TEXAS INSTRUMENTS INCORPORATED, Dallas, TX (US)

(72) Inventor: Michael Gerald Vrazel, Atlanta, GA (US)

(73) Assignee: Texas Instruments Incorporated, Dallas, TX (US)

(*) Notice: Subject to any disclaimer, the term of this patent is extended or adjusted under 35 U.S.C. 154(b) by 52 days.

(21) Appl. No.: 17/019,673

(22) Filed: Sep. 14, 2020

(65) Prior Publication Data
US 2022/0085967 A1  Mar. 17, 2022

(51) Int. Cl.
*H04L 7/00* (2006.01)

(52) U.S. Cl.
CPC .................... *H04L 7/0016* (2013.01)

(58) Field of Classification Search
CPC ...................................... H04L 7/0016
USPC .......................... 375/343, 331, 328
See application file for complete search history.

(56) References Cited

U.S. PATENT DOCUMENTS

| | | | | |
|---|---|---|---|---|
| 3,729,684 A * | 4/1973 | Shuda | .................... | H04L 7/0331 375/328 |
| 4,866,395 A | 9/1989 | Hostetter | | |
| 8,054,907 B2 * | 11/2011 | Hamre | .................... | H04L 1/205 375/348 |
| 2007/0183553 A1 * | 8/2007 | Sanders | .................. | H04L 7/033 375/376 |
| 2011/0169535 A1 * | 7/2011 | Kyles | .................... | H03L 7/0807 327/156 |
| 2011/0194659 A1 * | 8/2011 | Kenney | .................. | H03L 7/0807 375/355 |
| 2015/0326591 A1 * | 11/2015 | Bernard | .................... | H04J 3/14 398/40 |
| 2020/0084015 A1 | 3/2020 | Manian et al. | | |

FOREIGN PATENT DOCUMENTS

FR  2143722 A1  2/1973

OTHER PUBLICATIONS

Najm Farid N., "Low-Pass Filter for Computing the Transition Density in Digital Circuits", IEEE Transactions on Computer-Aided Design of Integrated Circuits and Systems, vol. 13, No. 9, Sep. 1994.
International Search Report and Written Opinion received for PCT Application No. PCT/US2021/050144, dated Dec. 16, 2021, 8 pages.

* cited by examiner

*Primary Examiner* — Qutbuddin Ghulamali
(74) *Attorney, Agent, or Firm* — Valerie M. Davis; Frank D. Cimino

(57) ABSTRACT

Signal conditioning circuitry includes logic circuitry, a low-pass filter, and comparator circuitry. The logic circuitry is configured to compare a data unit with a preceding data unit, from a sequence of data units, and provide a logic output signal. The low-pass filter is coupled to the logic circuitry, and the low-pass filter is configured to provide a data transition density measurement for the sequence of data units based on the logic output signal. The comparator circuitry is coupled to the low-pass filter, and the comparator circuitry is configured to compare the data transition density measurement to a threshold and, based on the comparison to the threshold, indicate a disruptive pattern in the sequence of data units.

23 Claims, 12 Drawing Sheets

DATA TRANSITION TRACKING FOR RECEIVED DATA

TECHNICAL FIELD

This relates generally to data transmission, and more particularly to data transition tracking for received data.

BACKGROUND

When a transmitter transmits a signal containing data (referred to herein as a data signal or a signal), such as a high speed data (HSD) signal, across a communication channel, the signal exiting the channel may be distorted relative to the signal entering the channel. Distortion compensation circuitry, for example an equalizer or a clock and data recovery (CDR) circuit, may receive the signal exiting the channel and perform distortion compensation on the signal before providing it to a receiver.

SUMMARY

In some situations, for example in the presence of disruptive data patterns, some or all of the distortion compensation circuitry may not reliably perform their intended function. As used herein, a disruptive data pattern is a sequence of data units (e.g., a sequence of data bits) having a pattern of values, amplitudes, or magnitudes that may cause a circuit to operate in a manner that leads to a failure to comply with a performance or operational criterion or that may cause the circuit to fail altogether. In this sense, the disruptive data pattern may be thought of as a "pathological" data sequence or "pathological" pattern to the distortion compensation circuit. Where the distortion compensation circuit is adaptive or performs an adaptive operation (also referred to as an adaptation), for instance the circuit periodically tunes to changing conditions of the channel, temperature, supply voltage, or other changes, operating the distortion compensation circuit, for instance the adaptation, during a disruptive data pattern or pathological pattern may cause the circuit to deviate from its preferred tuning.

Disclosed examples may be used to monitor changes or transitions in data and detect disruptive data patterns in a sequence of data units. Accordingly, one or more of the distortion compensation circuits may be gated, e.g., the adaptation suspended or the circuit restarted, in the presence of the disruptive data patterns and allowed to fully operate, e.g., the adaptation resumed, in the absence of the disruptive data patterns. In the absence of one or more of the disclosed examples, in addition to the aforementioned problems, channel reach extension provided by the distortion compensation circuitry may be degraded by nearly fifty percent or more where the distortion compensation circuitry includes an equalizer and a CDR circuit. One or more of the disclosed examples may reduce or eliminate this reach extension penalty. Moreover, one or more of the disclosed examples may prevent failure of the equalizer and/or CDR circuitry, thereby maintaining data signal integrity in the presence of disruptive data patterns.

In one example, signal conditioning circuitry includes logic circuitry, a low-pass filter, and comparator circuitry. The logic circuitry is configured to compare a data unit with a preceding data unit, from a sequence of data units, and provide a logic output signal. The low-pass filter is coupled to the logic circuitry, and the low-pass filter is configured to provide a data transition density measurement for the sequence of data units based on the logic output signal. The comparator circuitry is coupled to the low-pass filter, and the comparator circuitry is configured to compare the data transition density measurement to a threshold and, based on the comparison to the threshold, indicate a disruptive pattern in the sequence of data units. The indication of the disruptive pattern may be provided to a distortion compensation circuit so at least an aspect or portion of the distortion compensation circuit, such as adaptation, may be operated in the absence of the disruptive pattern and suspended or reset (generally referred to herein as "gating" or being "gated") in the presence of the disruptive pattern.

In another example, signal conditioning circuitry includes data transition tracking circuitry and an equalizer. The data transition tracking circuitry includes an exclusive OR gate, a low-pass filter coupled to the exclusive OR gate, and comparator circuitry coupled to the low-pass filter. The comparator circuitry is configured to compare a data transition density measurement to a threshold and, based on the comparison, indicate a disruptive pattern in a sequence of data units. The equalizer is coupled to the comparator circuitry and is configured to gate adaptive operation responsive to the indication In another example, a method includes comparing, a data unit with a preceding data unit, from a sequence of data units, and providing a logic output signal. The method also includes generating a time-averaged signal based on the logic output signal. The method also includes comparing the time-averaged signal to a threshold and, based on the comparison to the threshold, indicating a disruptive pattern in the sequence of data units. The method further includes gating distortion compensation circuitry adaptation responsive to the indication of the disruptive pattern.

DETAILED DESCRIPTION OF EXAMPLE EMBODIMENTS

Figure 1:
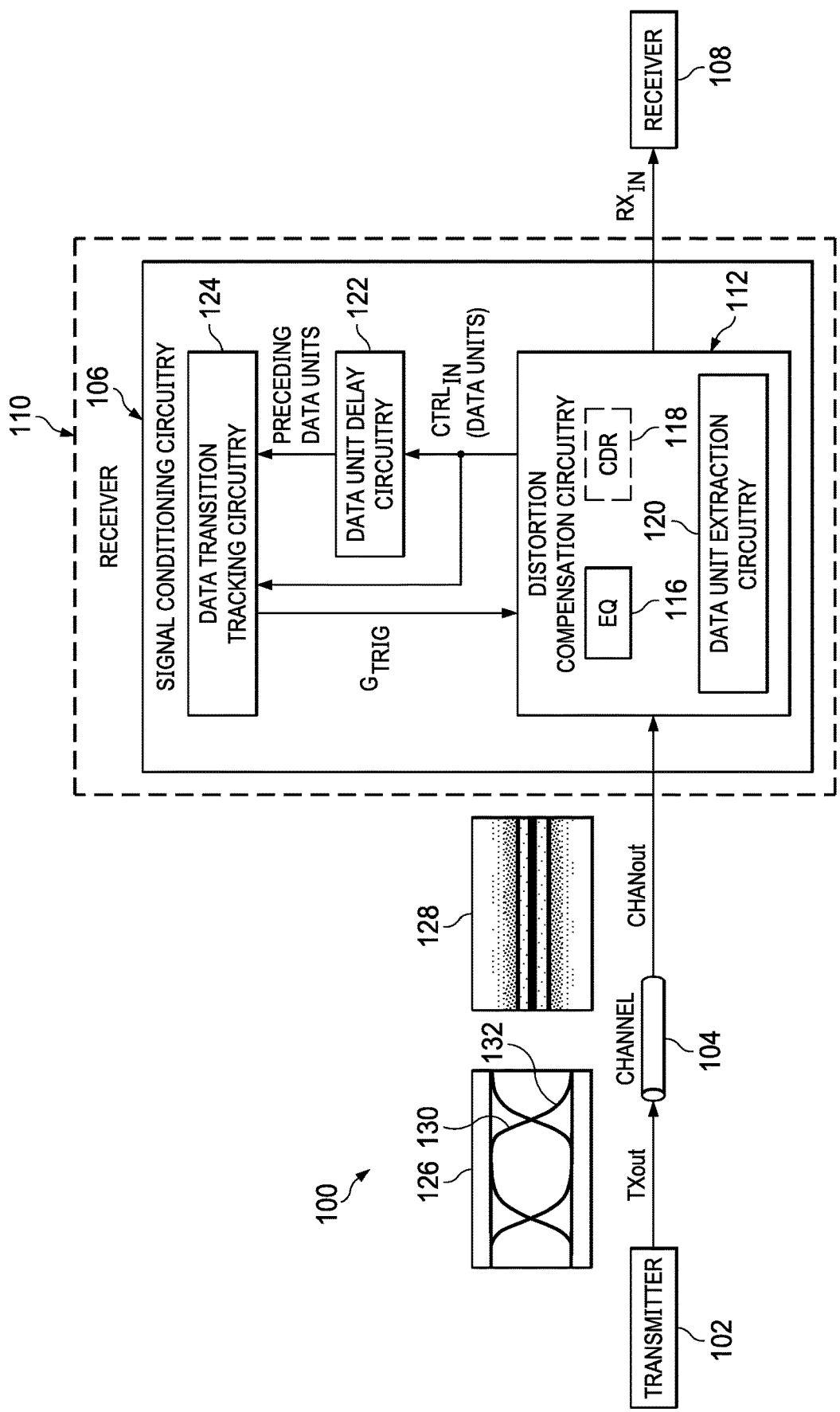
FIG. 1 depicts an example communication system having data transition tracking circuitry.

In the drawings, like reference numerals refer to like elements throughout, and the various features are not necessarily drawn to scale. In the description and in the claims, the terms "including" and "having" and variants thereof are intended to be inclusive in a manner similar to the term "comprising" unless otherwise noted. In addition, the terms "couple", "coupled" or "couples" means an indirect or direct electrical or mechanical connection.

Referring initially to FIG. 1, which depicts an example communication system 100 having data transition tracking circuitry 124, according to the present teachings. System 100 includes a transmitter 102, signal conditioning circuitry 106, and a receiver 108, coupled as illustrated. The transmitter 102 may transmit a data signal toward the receiver 108 using a channel 104, within the communication system 100. The signal conditioning circuitry 106 includes distortion compensation circuitry 112, data unit extraction circuitry 120, data unit delay circuitry 122, and the data transition tracking circuitry 124. The distortion compensation circuitry 112 includes an equalizer 116, for instance in the case of a re-driver circuit. In another example implementation, the distortion compensation circuitry 112 also includes a CDR 118, for instance in the case of a re-timer circuit.

As illustrated, the signal conditioning circuitry 106 is separate from the receiver 108. For instance, the signal conditioning circuitry 106 is included on a chip or die that is separate from one or more chips or die that include the circuitry of the receiver 108. However, the chip including the signal conditioning circuitry 106 and the one or more chips including the receiver 108 may share, e.g., may be mounted to, a common printed circuit board (PCB). Alternatively, the signal conditioning circuitry 106 may be integrated into a receiver 110, as illustrated by the dashed box representing the receiver 110. For instance, the signal conditioning circuitry 106 and circuitry of the receiver 110 are included on the same chip.

Also, although one-way communication is depicted, as illustrated by the arrows, the channel 104 may be used for two-way communication. As such, the transmitter 102 and the receiver 108 are each included in a transceiver (not shown). Additionally, in the example of two-way communication, signal conditioning circuitry 106 may also be included on the transmitter 102 side of the channel 104.

During operation of the system 100, the transmitter 102 transmits a data signal $TX_{OUT}$ using the channel 104. Channel 104 may be a "lossy" channel that distorts $TX_{OUT}$ during transmission, such that a distorted signal $CHAN_{OUT}$ is output from the channel 104. Diagram 126 depicts an example eye diagram representing $TX_{OUT}$, and diagram 128 depicts an example eye diagram representing $CHAN_{OUT}$. As illustrated by the eye diagrams, transitions in the data, e.g., 130 and 132, shown in the eye diagram 126 are not detectable in the eye diagram 128 and may be hardly distinguishable from noise. Distortion compensation circuitry 112 receives $CHAN_{OUT}$ and corrects distortion in the signal to provide a less distorted signal $RX_{IN}$ to the receiver 108.

In one example, the data signal $TX_{OUT}$ is a high speed serial data stream represented as voltages, where "high speed" may correspond to speeds of 1 Gigabits per second (Gbps) or higher. For instance, a 0 may be around −500 millivolts (mV), and a 1 may be around 500 mV. In a particular example, the data signal $TX_{OUT}$ is a broadband 4K or higher resolution digital video signal transmitted at 10 Gbps or higher and having frequency content from Nyquist down to much lower frequencies. Accordingly, the transmitter 102 may be a camera outputting the video signal. The channel 104 may be a coaxial cable with associated connectors coupled between the transmitter 102 and receiver 108 and used to send the video signal to the receiver 108. The receiver 108 performs digital signal processing on the received signal and outputs the video content to an output device (not shown), such as a television screen or monitor.

However, implementation is not limited to these examples. Namely, the transmitter 102 and the receiver 108 may be any two endpoints for a data signal sent over a physical medium, which is represented by the channel 104. For instance, in another example, the transmitter 102 is a microcontroller or central processing unit that sends $TX_{OUT}$ toward a receiver 108, which is a storage device or graphics controller, over a channel 104, which are traces on a PCB such as a mother board or daughter card. In other examples, the channel 104 is a HDMI cable, a USB cable, or a fiber optic link. In yet another example, the channel 104 is a wireless medium, where $TX_{OUT}$ is a modulated signal and/or an analog signal, and the transmitter 102 and receiver 108 have wireless capabilities. In the case of a wireless transmission, demodulation circuitry (not shown) may be coupled to the channel 104 to receive and demodulate $CHAN_{OUT}$ and provide a demodulated signal to the signal conditioning circuitry 106.

As the high speed broadband signal propagates, the channel 104 may attenuate higher frequency content of the signal as a function of frequency, thereby behaving effectively as a low pass filter. The signal $CHAN_{OUT}$ out of the channel 104 may also include amplitude and/or timing (temporal) noise referred to as jitter. The distortion compensation circuitry 112 removes at least some of the distortion on $CHAN_{OUT}$ and outputs a $RX_{IN}$ signal that is closer to $TX_{OUT}$, thereby allowing for data recovery in the receiver circuitry 108. Namely, the equalizer 116 functions as a high pass filter that compensates for the frequency-dependent loss in the channel 104 by adding gain back to the higher frequency content that was attenuated by the channel 104. The CDR 118 retimes the equalized signal to remove jitter and at least some of the distortion on $CHAN_{OUT}$. The equalized and/or retimed signal is the distortion-compensated signal $RX_{IN}$ provided to the receiver 108 and signal $CTRL_{IN}$, which includes data units) provided to the data unit delay circuitry 122. When the CDR 118 is not used, the equalizer 116 output may be provided to data unit extraction circuitry 120 (e.g., a decision circuit) to provide $CTRL_{IN}$. Although not shown for simplicity, the distortion compensation circuitry 112 may also include an output driver to drive a channel, e.g., cable, link, or trace on a PCB, between the distortion compensation circuitry 112 and the receiver 108.

Figure 2:
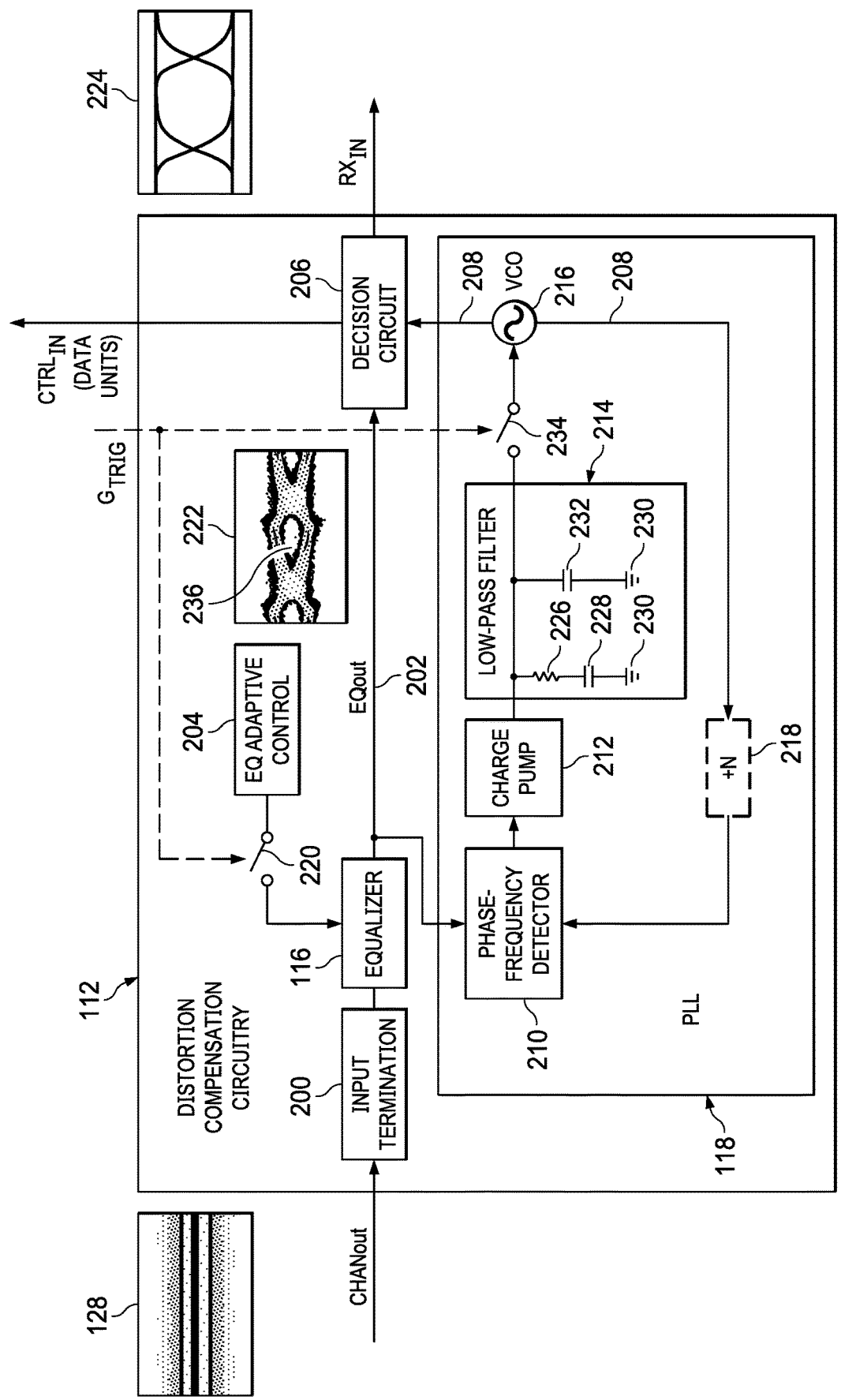
FIG. 2 depicts example distortion compensation circuitry that may be implemented in the system shown in FIG. 1.

FIG. 2 depicts example distortion compensation circuitry 112 that may be implemented in the system shown in FIG. 1. More particularly, FIG. 2 illustrates an example re-timer circuit implementation. In this example, the distortion compensation circuitry 112 includes both the equalizer 116 and the CDR 118. The distortion compensation circuitry also includes an input termination circuit 200, equalization (EQ) adaptive control circuitry 204, and a decision circuit 206 coupled as illustrated. In this example, the CDR 118 is implemented as a phase-locked loop (PLL) and includes a phase-frequency detector 210, a charge pump 212, a low pass filter 214, and a voltage-controlled oscillator (VCO) 216 coupled as illustrated. The low-pass filter includes a resistor 226, a capacitor 228, and a capacitor 232 coupled as shown between an output of the charge pump 212 and a reference voltage 230, such as ground.

In another example implementation, the PLL 118 includes a divide by N block 218, which divides the frequency of the VCO 216 by a factor of N. As such, block 218 is also referred to herein as frequency divider 218. Also, as shown, the CDR 118 uses a locally generated clock from VCO 216 for re-timing a signal from the equalizer 116 to generate a re-timed signal $RX_{IN}$.

As illustrated, the CDR 118 is implemented using a second order analog PLL, and is accordingly also referred to herein as a PLL 118. Alternatively, the CDR 118 is implemented using a digital PLL or a delay-locked loop (DLL). In another example implementation, the CDR is phase-interpolator based, which uses a PLL or DLL to implement a reference loop that accepts an input reference clock signal and produces a set of high speed clock signals, used as reference phases. These reference paths are fed to a CDR loop that includes circuitry for selecting pairs of reference phases and interpolating between them to provide clocks for recovering the data from the data signal. Also, for simplicity, the illustrated distortion compensation circuitry 112 shows the equalizer 116, decision circuit 206, and phase-frequency detector 210 as separate circuit blocks. However, there may be some overlap between the circuitry of these blocks.

During operation of the distortion compensation circuitry 112, $CHAN_{OUT}$ (as represented by the eye diagram 128) is received into the input termination circuitry 200. In an example, the input termination circuitry 200 includes one or more resistors that perform impedance matching while transferring the $CHAN_{OUT}$ signal to the equalizer 116. As mentioned earlier, the equalizer 116 functions as a high pass filter that compensates for the frequency-dependent loss in the $CHAN_{OUT}$ signal, thereby generating an equalized signal ($EQ_{OUT}$) 202. The equalized signal 202 is represented by an eye diagram 222. As can be seen in the eye diagram 222, transitions in the data are detectable. However, as can also be seen in the eye diagram 222, some noise and jitter still remain in the equalized signal 202.

The equalizer 116 may include a continuous time linear equalizer (CTLE), a feed-forward equalizer (FFE) with one or more taps, a decision feedback equalizer (DFE) with one or more taps and that also includes a decision circuit as part of a feedback loop, or a combination. The EQ adaptive control circuitry 204 allows the equalizer 116 to be adaptive by tuning or adjusting settings, such as a gain and a transfer function, of the equalizer 116 based on conditions in the channel 104 or other conditions or changes in the system such as changes in temperature and/or supply voltage. The EQ adaptive control circuitry 204 may be implemented as a hardware controller and memory or as a combination of sequential and combinational logic.

In one example implementation, before CDR lock, the EQ adaptive control circuitry 204 may search or "sweep" equalizer settings to establish initial settings to achieve CDR lock. At CDR lock, frequency and phase of a clock signal are adjusted such that the clock edges are aligned to the equalized signal 202. These initial equalizer settings may correspond, for instance, to the length of the channel 104, e.g., the length of a cable, and the associated attenuation of the channel 204, which is not known a priori. Thereafter, as temperature and/or supply voltage slowly changes over time, these initial equalizer settings, such as the gain and the transfer function of the equalizer 116, may be incrementally adjusted under the control of the EQ adaptive control circuitry 204.

In the example re-timer circuit implementation shown in FIG. 2, the equalized signal 202 is fed to the decision circuit 206 and to the PLL 118. In the absence of the PLL 118, for instance in a re-driver circuit implementation, the equalized signal 202 is fed to the decision circuit 206 and may also be fed directly to the receiver 108 (not shown). In both the re-timer and re-driver examples, the decision circuit 206 determines, at given points in time, whether the data in the equalized signal 202 is a 0 (low) or a 1 (high). In this sense, the decision circuit performs as data unit extraction circuitry.

In one example re-driver circuit implementation, the decision circuit 206 is a limiting or clipping amplifier that attempts to slice the equalized eye (e.g., element 236 illustrated in diagram 222) at zero volts or at the center of the eye 236. If the slicer output is greater than 0 (or the center of the equalized eye), the amplifier boosts the signal 202 until it clips in a positive direction. However, if the slicer output is less than 0 (or the center of the equalized eye) the amplifier boosts the signal until it clips in a negative direction. In this manner, the decision circuit 206 may reduce some of the voltage noise, but it does not address timing noise (jitter) associated with the equalized eye 236. The decision circuit 206 then provides the decisions, as $CTRL_{IN}$ (which includes a sequence of data units), to the data unit delay circuitry 122.

In the example re-timer circuit implementation shown in FIG. 2, the PLL 118 receives the equalized signal 202 into the phase-frequency detector 210. The phase-frequency detector 210 monitors a phase error in the signal 202 relative to the frequency of the VCO 216 or relative to a fraction of the frequency of the VCO 216, when the frequency divider 218 is implemented. Based on the phase error, the PLL 118 adjusts the frequency and phase of the VCO 216 output (clock signal 208) to the center of the timing noise distribution using the charge pump 212 and the low pass filter 214.

The clock signal 208 from the VCO, with the adjusted phase and frequency, is provided to the decision circuit 206 and to the feedback loop of the PLL 118. The decision circuit 206 uses the clock signal 208 to re-clock the equalized signal 202 to eliminate timing alignment error and, thereby, produce a re-timed signal $RX_{IN}$ and a re-timed signal $CTRL_{IN}$. $RX_{IN}$ is represented by the eye diagram 224, which is closer to $TX_{OUT}$ than either $CHAN_{OUT}$ or the equalized signal 202. Namely, the decision circuit 206 makes a decision on the equalized signal 202 as to whether on a given clock edge of the clock signal 208 (i.e., for every bit), is the equalized signal 202 a 1 or a 0. To do this, the decision circuit 206 is designed to sample in the center of the open eye 236 of the equalized signal 202 with the phase/frequency-aligned clock signal 208 to determine whether the sample is a 1 or 0. This results in a reduction of both the amplitude noise and the timing noise of the signal 202.

The decision circuit 206 may also include lock detection circuitry (not shown), which may include one or more registers and flip-flops. The lock detection circuitry determines when the CDR has achieved lock to the equalized signal 202 by comparing the frequency and phase of the equalized signal 202 to the frequency and phase of the clock signal 208. In a particular example implementation, before CDR lock is achieved, the decision circuit 206 provides the re-timed equalized signal 202 as $CTRL_{IN}$ to the data unit delay circuitry 122. However, no $RX_{IN}$ signal is initially provided to the receiver 108 because the signal may have an error rate, e.g., a bit error rate, which exceeds an acceptable threshold. After CDR lock, the decision circuit 206 provides the re-timed $CTRL_{IN}$ to the data unit delay circuitry 122 and provides the re-timed $RX_{IN}$ to the receiver 108.

The PLL 118 is also adaptive. More particularly, after the CDR has achieved lock to the equalized signal 202, the PLL 118 keeps the clock signal 208, from the VCO 216, aligned to the equalized signal 202 in the presence of noise, whether induced by the channel 104 or induced by the circuitry 112. When the clock signal 208 alignment deviates from ideal due to noise or temperature/supply voltage variation, also referred to as "hunting jitter," the deviation in alignment, or hunting jitter, is detected by the phase-frequency detector 210. The PLL 118 then uses the charge pump 212 and the low-pass filter 214 to pull the clock signal 208 back into alignment with the equalized signal 202 to, thereby, lessen the hunting jitter.

A problem with the distortion compensation circuitry 112 is that one or both of the equalizer 116 and the CDR 118 may malfunction or may function unreliably in the presence of certain sequences or patterns of data. For example, both the equalizer 116 and the CDR 118 are designed to operate reliably in the presence of random or pseudo-random, e.g., scrambled, data. Thus, for the equalizer 116 and/or the CDR 118, a pathological pattern or disruptive pattern in a sequence of data units (such as a sequence of bits) contains data that is no longer random or pseudo-random. For instance, a pathological pattern that may disrupt the operation of the equalizer 116 or the CDR 118 is a sequence of consecutive identical digits (CIDs), such as a consecutive sequence of 1s or a consecutive sequence of 0s, or some other repeating pattern such as a sequence of alternating 1s and 0s.

One example pathological pattern is a clock signal or data that mimics a clock signal with an alternating pattern of 1s and 0s. In a digital video application, an example pathological pattern may be a single 0 followed by 19 ones or a single 1 followed by 19 zeros, which may represent a color such as magenta. In other applications, a different sequence of data may lead to a pathological pattern for the distortion compensation circuitry.

A pathological pattern may cause any numbers of problems in the operation of the equalizer 116 and the CDR 118. For example, the pathological pattern may cause increased hunting jitter, which causes the CDR 118 to lose lock, thereby preventing data recovery. In another example, the pathological pattern causes the equalizer 116 to lose its current and preferred settings, which causes noise and resultant errors in the recovered data. In yet another example, the pathological pattern causes the equalizer 116 to fail, which also prevents data recovery.

One solution is to reduce the bandwidth of the CDR 118, which decreases its response time deviations in data-clock alignment. Another solution is to overdesign the receiver 108 with sufficient margin to tolerate increased hunting jitter and/or suboptimal equalizer settings. However, these solutions may result in one or more of sacrificed performance parameters of the receiver system as a whole, a more expensive receiver due to increased power consumption and circuit complexity, and/or failure of other specifications of the receiver system.

A solution, in accordance with the present disclosure, is to detect pathological patterns in the data and to gate "operation," which may include gating the adaptive behavior, of one of more of the distortion compensation circuits, e.g., the equalizer 116 and/or the CDR 118, in the presence of the pathological pattern. Namely, data transition tracking circuitry may be used to track a data transition density (DTD) measurement for a sequence of data units, e.g., a sequence of bits, and suspend the equalizer 116 adaptation and suspend or reset the CDR 118 phase/frequency tracking, for example, when the DTD measurement indicates a pathological pattern is present in the datastream. Once the pathological pattern is no longer detected, at least a portion or aspect of the equalizer 116 and CDR 118 operation (e.g., the adaptations) can be un-gated or allowed to operate and tune their respective blocks.

The "data transition density" or "DTD" is a ratio of data unit transitions to a total number of data units, across a length of time. For example, the DTD is the ratio of the number of transitions in a data stream (e.g. transitions from 0 to 1 or 1 to 0) to the total number of unit intervals (e.g., the number of recovered bits) of the data stream for a given period of time. For some example applications, the DTD of a high-speed digital data stream trends toward 0.5 for random or pseudo random data and trends toward 0 or 1 in the presence of a pathological pattern. Thus, the DTD can be compared to one or more thresholds to detect the presence of a pathological pattern. Once detected, the data transition tracking circuitry can output or provide a gating signal, referred to herein a $G_{TRIG}$, to gate the adaptation of the distortion compensation circuitry.

One or more advantages or benefits may be had using one or more example implementations of the present disclosure. An example advantage is the ability to gate the adaptation of the distortion compensation circuitry to prevent its failure or unreliability in the presence of a pathological pattern. For a re-timer circuit, the gating may include resetting the CDR before CDR lock in the presence of a pathological pattern to prevent the simultaneous processes of equalization sweeping and CDR locking from false locking, which could prevent data recovery. Another example advantage is that at least some circuitry used for data transition tracking is less complex than circuitry used in overdesigning the receiver. Another example advantage is preventing loss of preferred adapted equalization settings in the presence of a pathological pattern. Yet another example advantage, in the context of a re-timer circuit, is the ability to detect a pathological pattern even before data is reliably recoverable, e.g., even before CDR lock. This is because the data transition tracking circuitry may be designed such that a repeating pattern with long CID sequences is detectable even before the re-timed $CTRL_{IN}$ is generated.

Turning again to FIGS. 1 and 2, the distortion compensation circuitry 112 further includes a switch 220 and a switch 234. The switch 220 is coupled between the EQ adaptive control circuitry 204 and the equalizer 116. The switch 234 is coupled between the VCO 216 and the low pass filter 214. While operating the distortion compensation circuitry 112 in the presence of random or pseudo random data, the switches 220 and 234 are closed. However, in the presence of a detected pathological pattern, the distortion compensation circuitry 112 receives $G_{TRIG}$ from the data transition tracking circuitry 124.

Upon receiving $G_{TRIG}$, the switch 220 is opened, thereby gating the EQ adaptive control circuitry 204. This effectively freezes or maintains the equalizer settings until the pathological pattern is no longer detected, wherein the switch 220 is closed, thereby re-enabling the EQ adaptive control circuitry 204. Upon receiving $G_{TRIG}$, the switch 234 is also opened, thereby gating the phase and frequency tracking capabilities of the PLL 118. This holds the frequency of the VCO 216 constant until the pathological pattern is no longer detected, wherein the switch 234 is closed, thereby allowing phase and frequency tracking and associated adapting of the phase and frequency of the VCO 216. Other gating could be performed using $G_{TRIG}$. In another example, the lock detection circuitry (not shown) that detects CDR lock is gated in addition to or instead of opening the switch 234.

Figure 3:
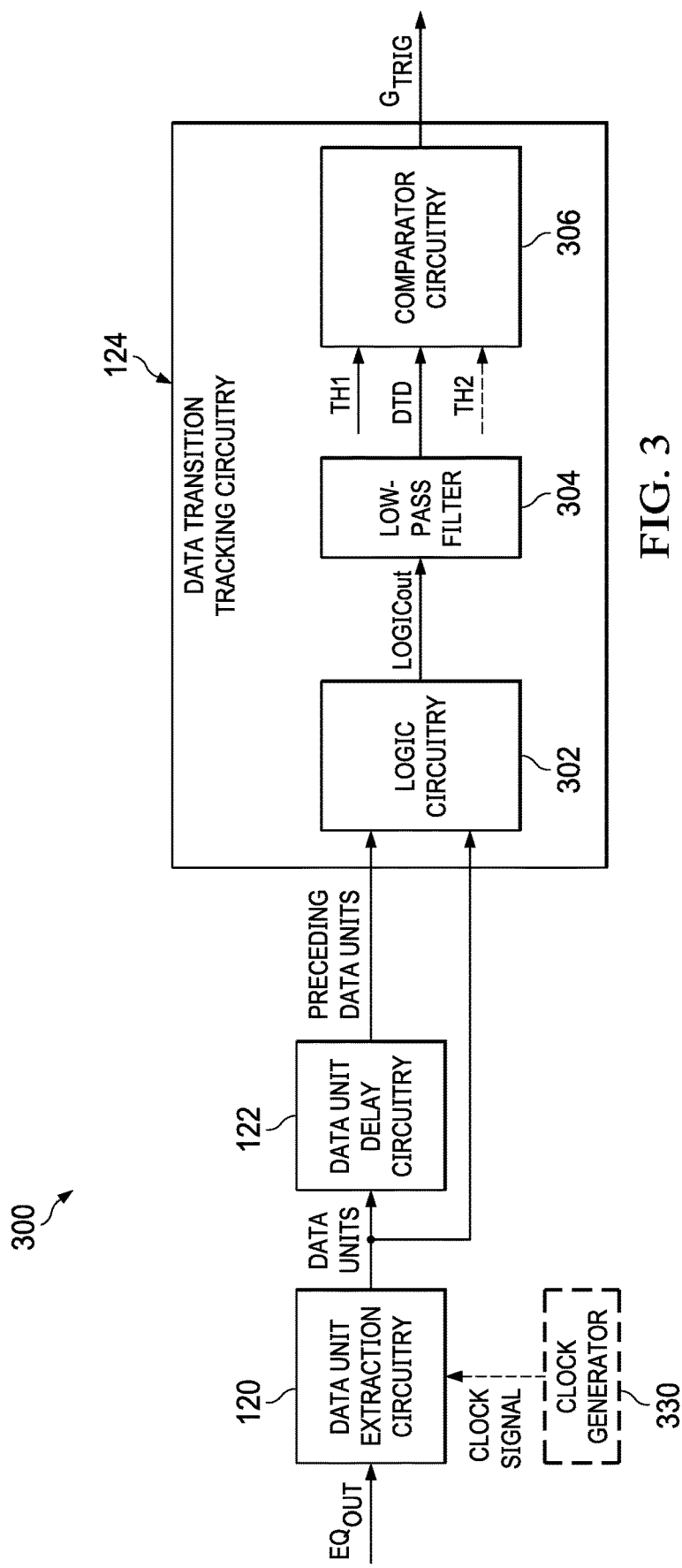
FIG. 3 depicts a portion of the signal conditioning circuitry shown FIG. 1, including example data transition tracking circuitry.

FIG. 3 depicts a portion 300 of the signal conditioning circuitry 106 of FIG. 1, including example data transition tracking circuitry 124. More particularly, the circuitry 300 further includes the data unit extraction circuitry 120 and the data unit delay circuitry 122. The data transition includes data unit extraction circuitry 120, data unit delay circuitry 122, and the data transition tracking circuitry 124. The data transition tracking circuitry 124 includes logic circuitry 302, a low-pass filter 304, and comparator circuitry 306 coupled as shown.

The data unit extraction circuitry 120 extracts and outputs a sequence of data units, e.g., data bits, from a signal that is received into the signal conditioning circuitry. The signal may be $CHAN_{OUT}$ from the channel 104 or may be $EQ_{OUT}$, the output of an equalizer. However, in the following description, we will refer to the signal into the data unit extraction circuitry 120 as $EQ_{OUT}$. The data unit extraction circuitry 120 provides the data units as $CTRL_{IN}$, which may be the output of a decision circuit within a re-timer or re-driver circuit and is the digital equivalent of $RX_{IN}$. In the re-timer implementation, the data unit extraction circuitry 120 also receives a clock signal from a clock generator 330. For example, the clock generator 330 is a phase-aligned clock signal output from the CDR, e.g., the clock signal 208 from the CDR 118.

In one example implementation, such as when a re-timer is used, the data unit extraction circuitry 120 includes a sampler that receives $EQ_{OUT}$ and the clock signal, samples $EQ_{OUT}$ at each clock edge, and outputs resultant bits as the data units. The sampler may be implemented using a buffer amplifier, an operational amplifier (op amp), a switch (such as a field effect transistor) coupled between an output of the buffer amplifier and an input of the op amp, and a capacitor coupled to the input of the op amp. The sampler receives $EQ_{OUT}$ into the buffer amplifier, the switch may be opened and closed on the clock edges to sample and output a voltage corresponding to the charged state of the capacitor, which represents a 1 or 0 sampled bit from $EQ_{OUT}$.

In another example implementation, such as when a re-driver is used, the data unit extraction circuitry 120 includes a slicer that receives $EQ_{OUT}$ and outputs resultant bits as the data units. The slicer may be implemented using an analog comparator that compares $EQ_{OUT}$ with a threshold. If $EQ_{OUT}$ exceeds the threshold, the comparator output goes high, indicating a 1. If $RX_{IN}EQ_{OUT}$ goes below the threshold, the comparator output goes low, indicating a 0.

The data unit delay circuitry 122 receives the data units and generates one or more preceding data units. In a digital circuit example, the data unit delay circuitry 122 includes a deserializer that generates multiple parallel bits and preceding bits. In analog or mixed analog/digital examples, the data unit delay circuitry 122 includes a flip-flop, a delay line, or some other analog delay circuitry that delays the current data unit, e.g. bit, by one unit interval period.

The logic circuitry 302, for instance one or more XOR gates, receives and compares the one or more data units with the one or more preceding data units, from the sequence of data units, and produces a logic output signal (e.g., $LOGIC_{OUT}$) based on the comparison. The low-pass filter 304 provides a time-averaged DTD measurement for the sequence of data units based on the logic output signal. The comparator circuitry 306 compares the DTD measurement to at least one threshold, e.g., TH1, and, based on the comparison, indicates whether there is a disruptive (pathological) pattern in the sequence of data units. The indication is shown as a signal $G_{TRIG}$.

In one example, such as when a rectifier is used, the comparator circuitry 306 compares the DTD measurement to a single threshold TH1, also referred to herein as the upper threshold. When the DTD measurement exceeds the threshold, a pathological pattern is indicated by $G_{TRIG}$. In another example, the comparator circuitry 306 compares the DTD measurement to threshold TH1 and threshold TH2, also referred to herein as the lower threshold. When the DTD measurement is outside of either threshold, e.g., is higher than threshold TH1 or is lower than threshold TH2, a pathological pattern is indicated by $G_{TRIG}$.

In an example, low pass filter 304 has a low enough cut-off frequency so that $G_{TRIG}$ doesn't indicate a pathological pattern during momentary excursions in the data, e.g. short bursts of CIDs. Additionally, a time constant of the data transition tracking circuitry 124 is smaller than a time constant of other control logic (e.g., for the adaptive equalizer 116) that is gated off the DTD measurement, using $G_{TRIG}$. This enables the data transition tracking circuitry 124 to react faster than other adaptation circuitry to suspend or reset the adaptation circuitry before the pathological pattern can distort the adaptation. In a particular example, the time constant of the low-pass filter 304 is approximately one order of magnitude smaller than the time constant of the adaptive control circuitry that is gated using $G_{TRIG}$. Accordingly, the transition tracking circuitry 124 would react 10 times faster than other adaptation circuitry in the system.

Figure 4:
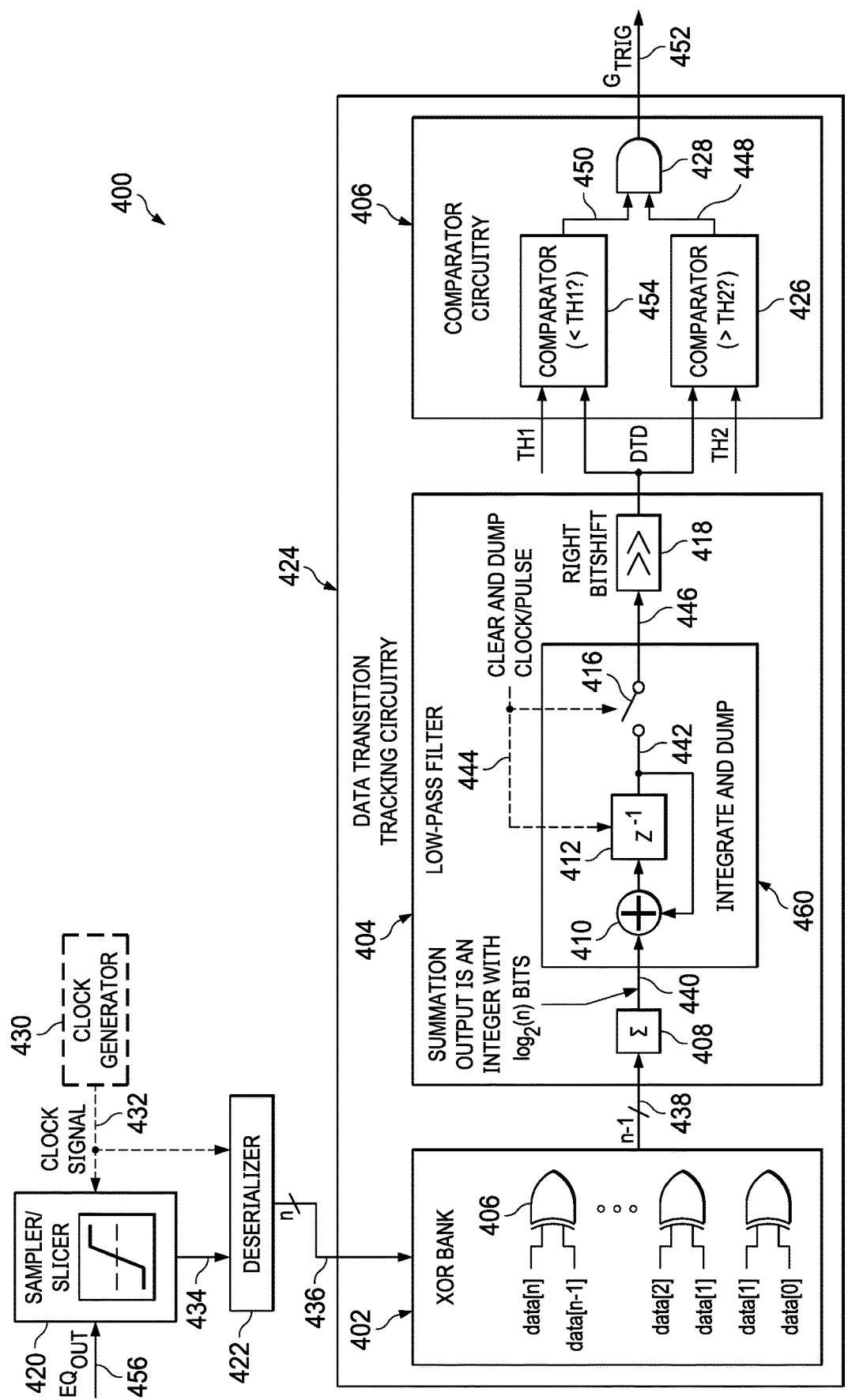
FIG. 4 depicts example signal conditioning circuitry having data transition tracking circuitry.

FIGS. 4, 8, and 10-12 depict signal conditioning circuitry including different examples of data transition tracking circuitry according to the present disclosure. In particular, FIG. 4 depicts example signal conditioning circuitry 400 having an example digital implementation of data transition tracking circuitry. Namely, circuitry 400 includes a sampler or slicer 420 as data unit extraction circuitry, a deserializer 422 as data unit delay circuitry, and data transition tracking circuitry 424, coupled as shown.

In one example implementation, the circuitry 400 is used with a re-timer circuit as the distortion compensation circuitry, wherein the block 420 is a sampler that receives both an equalized signal $EQ_{OUT}$ 456 and a phase-aligned clock signal 432 from a clock generator 430 to use in generating a sequence of data units 434, in this case a sequence of bits. For instance, the clock generator 430 is a local VCO within a CDR of the re-timer circuit. The sampler 420 may be implemented as described above by reference to block 120 of FIG. 3. In another example implementation, the circuitry 400 is used with a re-driver circuit as the distortion compensation circuitry, wherein the block 420 is a slicer that receives only the $EQ_{OUT}$ signal 456 to use in generating the sequence of bits 434. The slicer 420 may be implemented as described above by reference to block 120 of FIG. 3. In both the re-timer and re-driver implementations, the remaining circuitry 422 and 424 are the same. Accordingly, only one implementation (in this case the re-timer circuit implementation) is described by reference to FIG. 4 and the associated FIGS. 5-7.

In a particular example, the $EQ_{OUT}$ signal, which includes data, is provided at about 10 Gb/second. Accordingly, every 100 picoseconds (e.g., 1 unit interval (UI) or 1 period of 10 Gb data), the sampler 420 samples the center of the data on the rising edge of the clock signal 432 to output a new bit of data. This high speed serial data stream 434 is provided to the deserializer 422. The deserializer 422 parallelizes the serial data stream 434 into multiple (n) slower data streams 436, which are processed by the data transition tracking circuitry 424, in the digital domain. In other examples, the data rate may be different, for instance 270 Mb/s to 12 Gb/s or even higher data rates such as 50 Gb/s, 100 Gb/s or higher.

In an example implementation, the deserializer 122 includes multiple shift registers configured as serial-in, parallel out (SIPO). In an example application, e.g., digital video, n=64. Although n may be other values, such as 32. Accordingly, the deserializer 422 receives 64 sequential bits (1, 2, 3, ... n) coming from the serial data stream 434 and outputs them onto 64 respective (separate) lines. The high speed sampling clock signal 432 is also fed into the deserializer 422 where it gets divided down (for instance in stages) to divide by n, to which the n parallel output bits 436 are timed. Thus, each of the 64 lines with the n parallel bits 436, which is provided to the data transition tracking circuitry 424, is 64 times slower than the serial data stream 434.

The data transition tracking circuitry 424 includes the digital logic circuitry of an XOR bank 402 having multiple XOR gates (one of which is labeled 406), a low-pass filter 404, and comparator circuitry 406, coupled as shown. The low-pass filter 404 includes a summer 408 having an input coupled to outputs of the XOR bank 402 and an integrate and dump circuit 460 coupled to an output of the summer 408. The low-pass filter 404 may also include a right bitshift 418 coupled to an output of the integrate and dump circuit 404. The integrate and dump circuit 460 includes an accumulator having an adder 410 and a $z^{-1}$ register 412, wherein $z^{-1}$ indicates that the register 412 is delayed by one clock cycle. Inputs of the adder 410 are, respectively, coupled to an output of the summer 408 and an output of the register 412 (forming a feedback loop). An output of the adder 410 is coupled to an input of the register 412. The integrate and dump circuit 460 also includes a switch 416 having one terminal coupled to the output of the register 412 and another terminal coupled to an input of the right bitshift 418 (if used in the circuit) or to inputs of the comparator circuitry 406.

The comparator circuitry 406 includes two digital comparators 454 and 426 and an AND gate 428. One input of the comparator 454 and one input of the comparator 426 is coupled to the terminal of the switch 416 or the output of the right bitshift 418. Another input of the comparator 454 is coupled to receive an upper threshold TH1. Another input of the comparator 426 is coupled to receive a lower threshold TH2. The thresholds TH1 and TH2 may be programmed into a register or some other memory device (not shown) coupled to the comparators 454 and 426. Outputs of the comparators 454 and 426 are coupled to inputs of the AND gate 428, and a $G_{TRIG}$ signal 452 is provided at an output of the AND gate 428.

The n parallel bits 436 are input into the multiple (e.g. 63) XOR gates 406, where each bit is XORed against a preceding bit. Thus, for 64 signals 436 going in, we have (n−1) 63 signals 438 coming out of the XOR bank 402. The summer 408 combines (e.g., adds) the 63 signals 438 into a single signal 440 of integer values, each having log 2(n) bits, or 6 bits in this example. In this example, the minimum value of the single signal 440 could be 0, and the maximum value could be 63. The integer value of signal 440 updates at a rate of ⅟₆₄ the original data rate, every deserializer clock edge.

The signal 440 is provided to the integrate and dump circuit 460, which provides a time-averaged DTD signal or measurement 446. If used, the right bitshift 418 truncates the least significant bits (LSBs) to remove noise from the signal 446. Namely, the sum of the signal 440 from the output of the summer 408 and the signal 442 output from the register are accumulated in the register 412 until a clear and dump clock edge or pulse 444 is provided to the register 412 and the switch 416. The pulse 444 closes the switch 416, causes the current accumulated sum 442 to be output from the integrate and dump circuit 460 as the DTD measurement 446, and clears the register 412. The switch 416 is then opened again to restart the accumulator until another clock edge or pulse 444 is provided. The switch 416 is used in this example. However, in an alternative example, the switch 416 is absent, and the low-pass filter 404 is designed to monitor a slope or rate of change of the signal 440.

Comparator 454 compares the DTD measurement 446 to TH1, and asserts, e.g., provides a high signal 450 (of 1), when the signal 446 is less than TH1. Otherwise, the comparator 454 is de-asserted, thereby providing a low signal 450 (of 0). Comparator 426 compares the DTD measurement 446 to TH2, and asserts, e.g., provides a high signal 448 (of 1), when the signal 446 is greater than TH2. Otherwise, the comparator 426 is de-asserted, thereby providing a low signal 448 (of 0).

The AND gate 428 asserts, e.g., provides a high $G_{TRIG}$ signal 452 (of 1), when both signals 450 and 448 are high, indicating "good" data, meaning the type of data that allows proper operation of the distortion compensation circuitry adaptation. Thus, the high $G_{TRIG}$ signal 452 signals the distortion compensation circuitry to continue operating in a continuously adaptive fashion. In one example, good data is sufficiently randomized data. Conversely, when either or both of the signals 450 and 448 are low, the AND gate 428 is de-asserted, thereby providing a low $G_{TRIG}$ signal 452 (of 0). A low $G_{TRIG}$ signal 452 indicates a pathological pattern and, thereby, allows the gating of the distortion compensation circuitry adaptation.

TH1 and TH2 are application specific and implementation specific. In one example, TH1 and TH2 are designed based on the value of n and the design of the integrate and dump circuit 460. Namely, the register 412 accumulates the signal 440 for a number cycles of the divide by n clock signal, and its output signal 446 may be represented as a multi-bit digital number. The size of the accumulator depth (total number of bits) and the frequency of the read and clear clock or pulse determines the level of averaging provided by the integrate and dump circuit. Accordingly, the thresholds TH1 and TH2 may be determined by the amount of averaging performed by the integrate and dump circuit 460, the frequency the DTD 446 measurement is provided, and the number of output signals 438 from the XOR bank 402.

In the example where n is 64, when the data 434 is random or pseudo random, the output signal 438 from the summer 408 is expected to be in the middle of the extremes, e.g., around 31.5, which is halfway between 0 and 63. If the data 434 contains a pathological pattern, the output signal 438 from the summer 408 skews toward the maximum (63) or minimum (0), for a sufficiently long period that the time averaged DTD measurement signal 446 triggers the AND gate 428 to de-assert and indicate the presence of the pathological pattern. In the example where n=64, the thresholds TH1 and TH2 may be set to 400 and 275, respectively, to cause the AND gate 428 to de-assert when the DTD measurement 446 goes outside of those thresholds.

Figure 5:
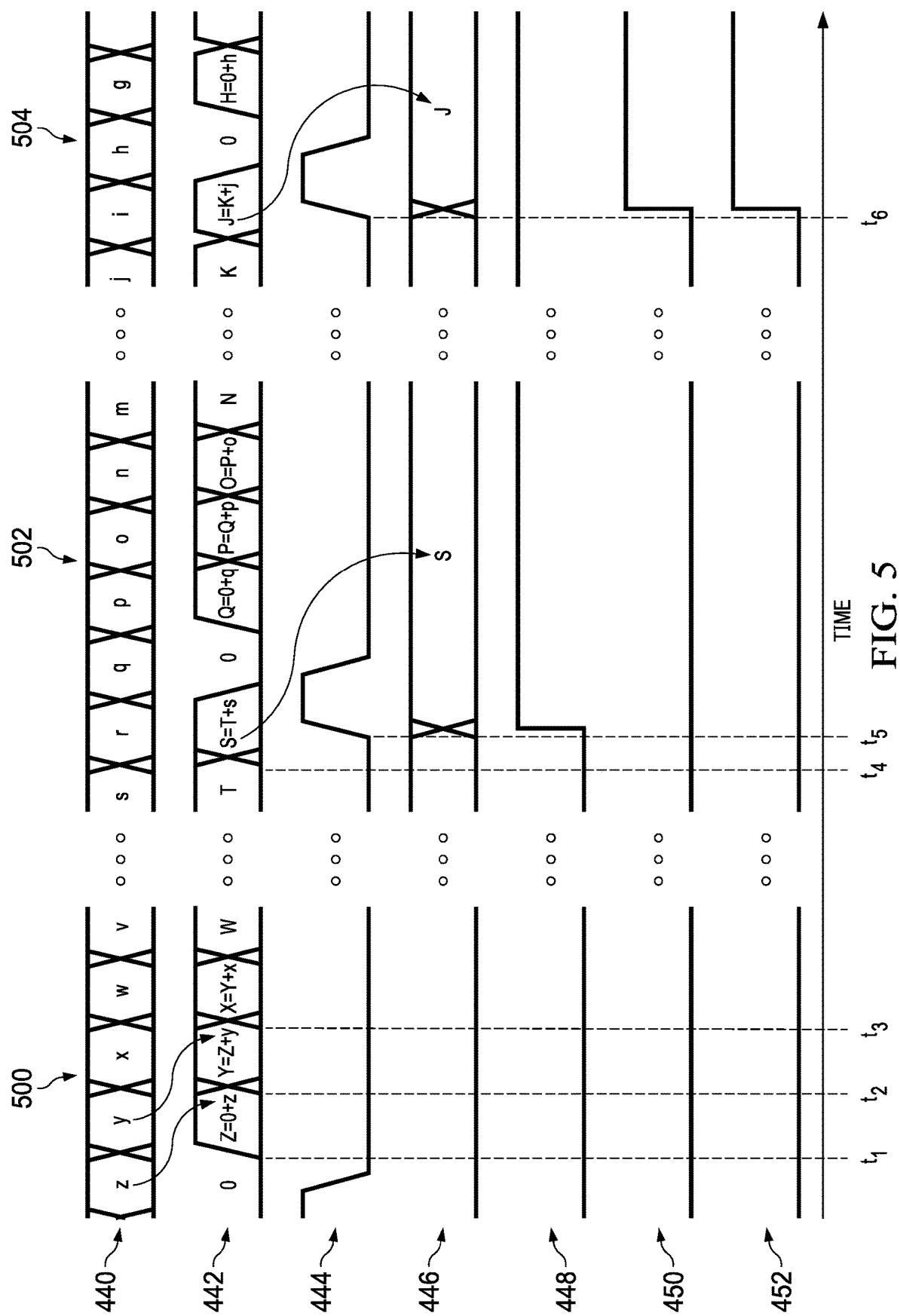
FIG. 5 depicts timing diagrams illustrating operation of the signal conditioning circuitry shown in FIG. 4.

FIG. 5 depicts timing diagrams illustrating operation of the signal conditioning circuitry 400 shown in FIG. 4, without the right bitshift 418. Particularly, waveforms 440, 442, 444, 446, 448, 450, and 452, for three time segments 500, 502, and 504, represent respective signals shown in FIG. 4 having the same reference numbers. The signal 440, depicted as lower case letters representing a series of integer values, is provided by the summer 408 to the integrate and dump circuit 406. The accumulated sums 442, as a result of the feedback, are depicted as a series of capital letters representing a series of integer values.

At the start of the timing diagrams, it is assumed that the register 412 has just been cleared, as indicated by the 0 at the start of waveform 442 and an absence of a value in waveform 446. Throughout time segment 500, the clear and dump pulse 444 is not provided, and waveforms 448, 450, and 452 are depicted as being low (0). For the first subsequent clock edge (at time $t_1$), the accumulated signal 442 has a value of Z, which is the previous value of 0, that's being fed back, summed with the current value of z from the signal 440. As further illustrated, the accumulated signal 442 is delayed by one clock edge from the values denoted by waveform 440, because of the one clock delay at the $z^{-1}$ register 412.

For the next clock edge (at time $t_2$), the accumulated signal 442 has a value of Y, which is the previous value of Z, that's being fed back, summed with the current value of y from the signal 440. For the next clock edge (at time $t_3$), the accumulated signal 442 has a value of X, which is the previous value of Y, that's being fed back, summed with the current value of x from the signal 440. This accumulation continues until a clear and dump pulse 444 is provided to the integrate and dump circuit 460 at time $t_5$ during the time segment 502. The final accumulation before the pulse 444 occurs at time $t_4$, wherein the accumulated signal 442 has a value of S. S is the previous value of T, that's being fed back, summed with the current value of s from the signal 440. In an alternative implementation, the clear and dump signal 444 is a clock instead of a pulse.

At the rising edge of the clear and dump pulse 444, the switch 416 is closed and the value of the register 412 (currently S) is provided as the DTD measurement 446 out of the integrate and dump circuit 460. The switch 416 is then opened, and the register 412 is cleared, as indicated by the 0 in waveform 442, so that the accumulation starts again and continues (as shown) until a clear and dump pulse 444 is provided to the integrate and dump circuit 460 at time $t_6$ during the time segment 504.

The accumulated signal 442, just before the pulse 444 at time $t_6$, has a value of J. J is the previous value of K, that's being fed back, summed with the current value of j from the signal 440. At the rising edge of the clear and dump pulse 444, the switch 416 is closed and the value of the register 412 (currently J) is provided as the DTD measurement 446 out of the integrate and dump circuit 460. The switch 416 is then opened, and the register 412 is cleared, as indicated by the 0 in waveform 442 during the time segment 504, so that the accumulation starts again.

During the time segment 502, it is assumed that the DTD value 446 of S provided to the comparators 454 and 426 is greater than TH1 and greater than TH2. This causes the output signal 448 of the comparator 426 to go high, while the output signal 450 of the comparator 454 remains low. Accordingly, the $G_{TRIG}$ signal 452 output from the AND gate 428 remains low, indicating a pathological pattern, which can be used to gate distortion compensation circuitry adaptation. However, during the time segment 504, it is assumed that the DTD value 446 of J provided to the comparators 454 and 426 is less than TH1 and greater than TH2. This causes the output signal 448 of the comparator 426 to stay high and the output signal 450 of the comparator 454 to go from low to high. Accordingly, the $G_{TRIG}$ signal 452 output from the AND gate 428 goes high, indicating good data, which signals the distortion compensation circuitry to resume operating in an adaptive fashion.

Figure 6:
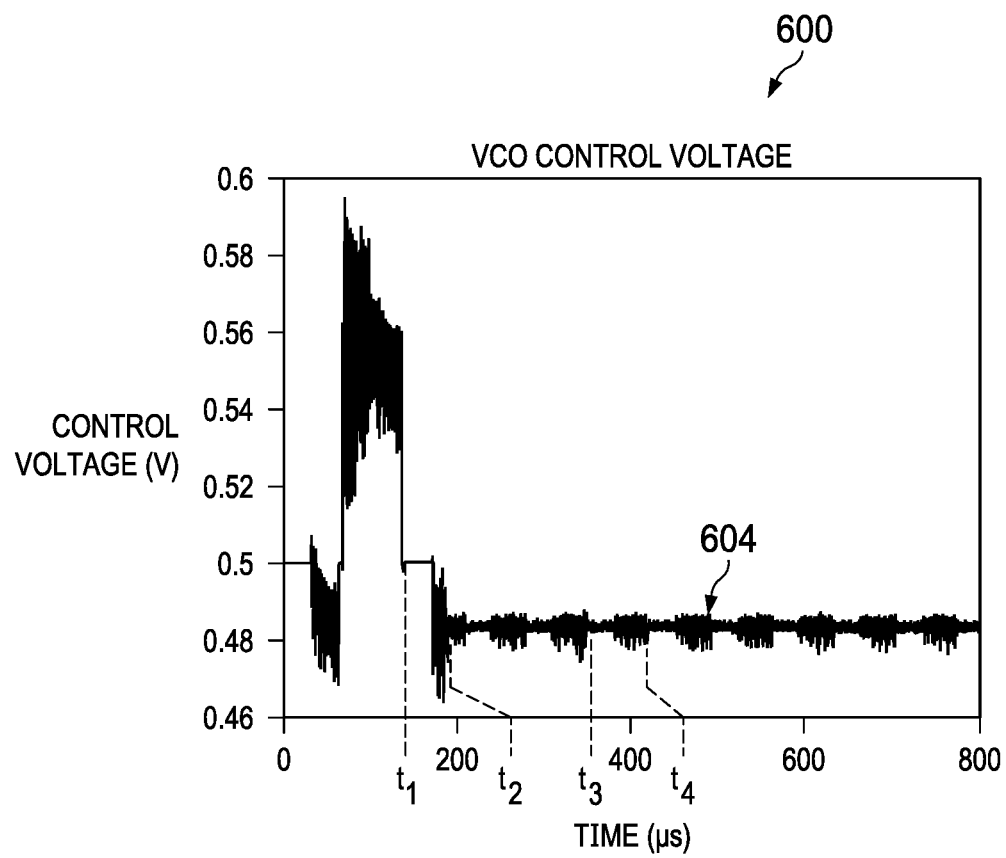
FIG. 6 depicts simulation results from operating the signal conditioning circuitry shown in FIGS. 2 and 4.
Figure 6:
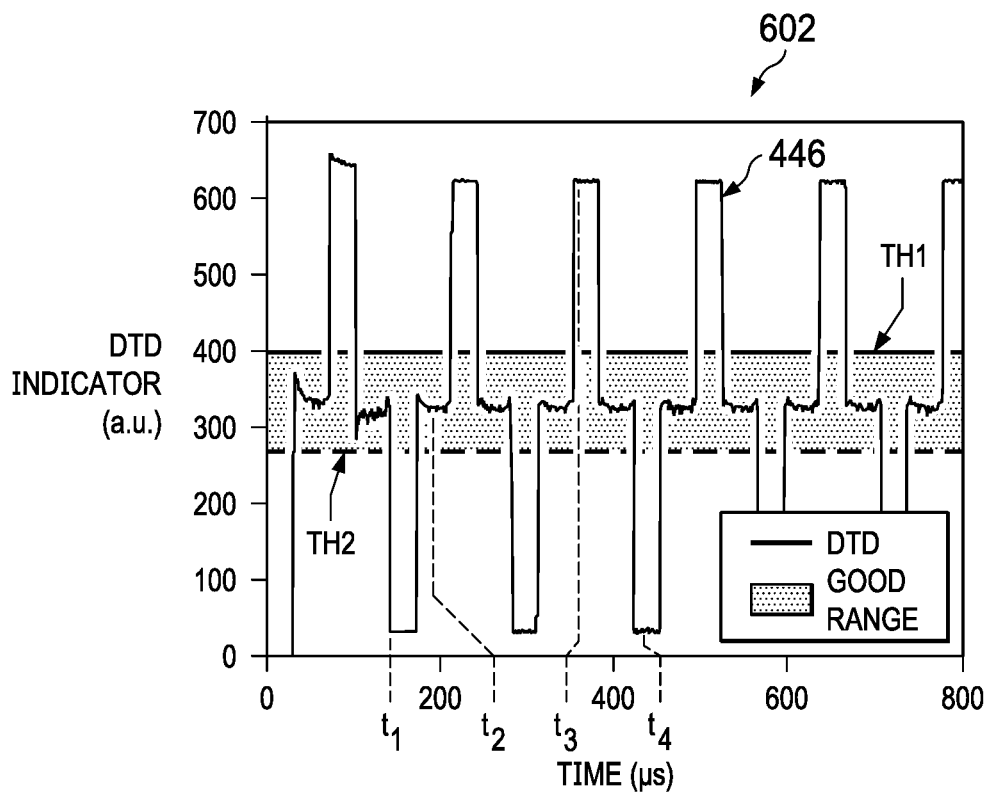
Figure 7:
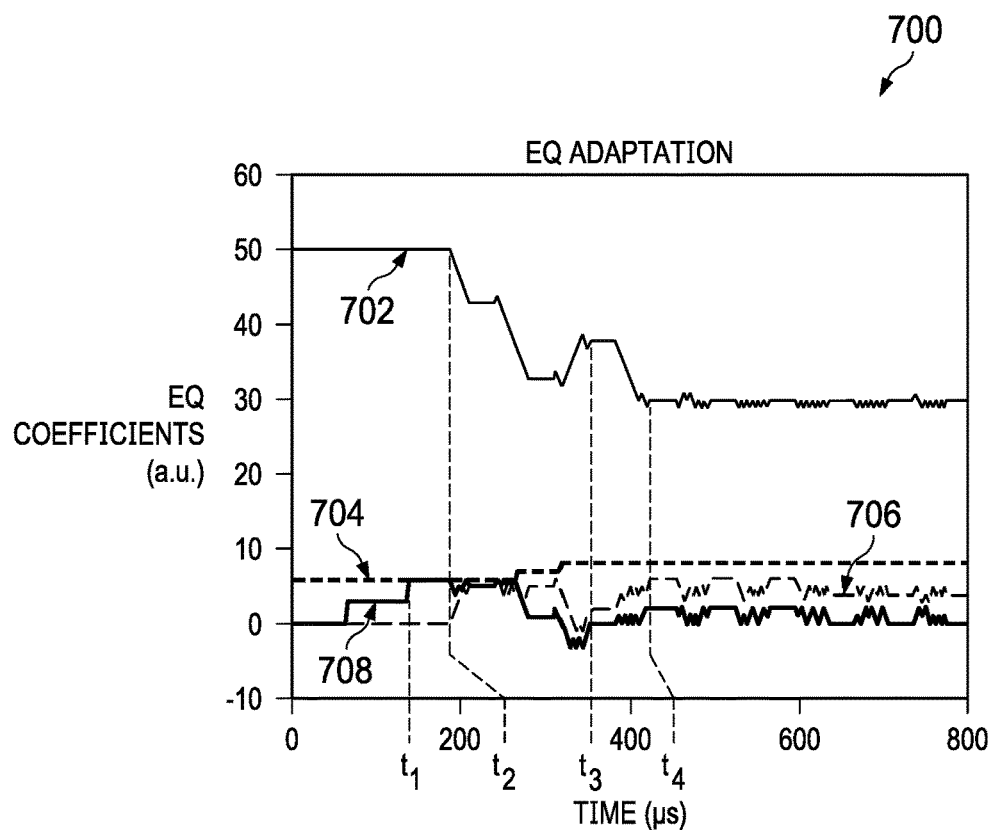
FIG. 7 depicts simulation results from operating the signal conditioning circuitry shown in FIGS. 2 and 4.

FIGS. 6 and 7 depict simulation results from operating the signal conditioning circuitry 112 and 400 shown in FIGS. 2 and 4 collectively. FIG. 6 illustrates a diagram 600 depicting a waveform 604 representing the control voltage of the VCO 216 plotted against time. FIG. 6 also illustrates a diagram 603 depicting a waveform 446 representing the DTD measurement signal 446 plotted over time. Lines superimposed on the waveform 446, illustrate the upper threshold TH1 of 400 and the lower threshold TH2 of 274. FIG. 7 illustrates a diagram 700 depicting a waveform 706 representing adaptation of a CTLE of the equalizer 116 plotted against time. FIG. 7 also illustrate waveforms 702, 704, and 708, depicting adaptation generated for three tap coefficients of a DFE of the equalizer 116 plotted against time.

In the example simulation, and as illustrated by the waveform 604, the CDR 118 acquires lock to the equalized signal 202 at a time $t_2$ with a 500 ppm offset. Prior to CDR lock, the CTLE (waveform 706) starts at minimum boost and increments by 3 after a timeout if the CDR 118 fails to lock. Prior to detecting CDR lock, the VCO control voltage 604 is reset if CTLE timeout occurs. The VCO control voltage 604 is also reset if the DTD measurement 446 transitions from indicating a pathological pattern to indicating random or pseudo random data. This reset is indicated, for example, during the time frame between $t_1$ and $t_2$, when the DTD measurement 446 transitions from being less than TH2 to being between TH1 and TH2. Accordingly, the DTD measurement 446 can indicate a pathological pattern prior to CDR lock. Additionally, waveforms 702-708 illustrate that both before and after CDR lock (which occurs at time $t_2$), the equalization adaptation is suspended. The suspended equalization is depicted by the horizontal portion of the waveforms 702-708, for instance starting at times $t_1$, $t_3$, and $t_4$, when the DTD measurement 446 is outside of TH1 or TH2.

Figure 8:
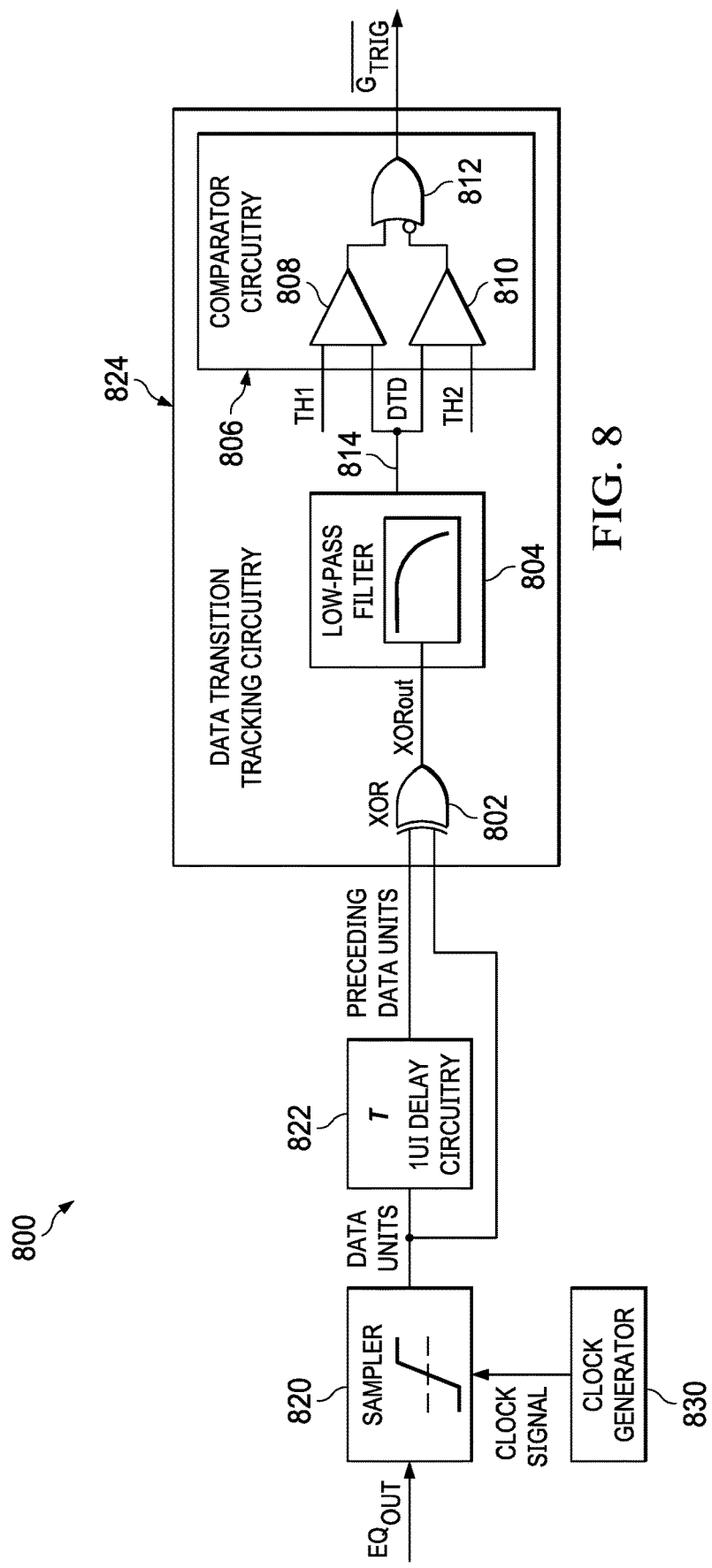
FIG. 8 depicts example signal conditioning circuitry having data transition tracking circuitry.

FIG. 8 depicts example signal conditioning circuitry 800 having an example analog implementation of data transition tracking circuitry. Namely, circuitry 800 includes a sampler 820 as data unit extraction circuitry, a 1 UI delay circuitry 822 as data unit delay circuitry, and data transition tracking circuitry 824. In this example implementation, the circuitry 800 is used with a re-timer circuit as the distortion compensation circuitry, wherein the sampler 820 receives both an equalized signal $EQ_{OUT}$ containing data and a phase-aligned clock signal from a clock generator 830 to use in generating a sequence of data units, in this case a sequence of bits. For instance, the clock generator 830 is a local VCO within a CDR of the re-timer circuit. The sampler 820 may be implemented as described above by reference to block 120 of FIG. 3.

Accordingly, every 1 UI or 1 period of data, the sampler 820 samples the center of the data on the rising edge of the clock signal to output a recovered bit of data. This high speed serial data stream is provided to the delay circuitry 822 and to the data transition tracking circuitry 824. The delay circuitry 822 delays each bit in the serial data stream by 1 UI–. The delay circuitry 822 outputs the delayed data bits, as preceding data units, to the data transition tracking circuitry 824. In one example, the delay circuitry 822 is implemented using a D flip flop.

The data transition tracking circuitry 824 includes the analog circuitry of an XOR gate 802, a low-pass filter 804, and comparator circuitry 806. The low-pass filter 804 may be implemented as an RC circuit, having at least one resistor and one capacitor. The comparator circuitry 806 includes an analog comparator 808, an analog comparator 810, and an OR gate 812 having an inversion at the input corresponding to the TH2 comparator 810 output.

As illustrated, one input of the XOR gate 802 is coupled to an output of the sampler 820. The other input of the XOR gate 802 is coupled to an output of the delay circuitry 822. An output of the XOR gate 802 is coupled to an input of the low-pass filter 804. An output of the low-pass filter 804 is coupled to one input of the comparator 808 and to one input of the comparator 810. Another input of the comparator 808 is coupled to receive an upper threshold TH1. Another input of the comparator 810 is coupled to receive a lower threshold TH2. The thresholds TH1 and TH2 may be programmed into a register or some other memory device (not shown) coupled to the comparators 808 and 810. Outputs of the comparators 808 and 810 are coupled to inputs of the OR gate 812, and a $G_{TRIG}$ signal is provided at an output of the OR gate 812.

The XOR gate 802 XORs each bit against a preceding bit and provides a resulting $XOR_{OUT}$ signal. The low-pass filter 804 time-averages the $XOR_{OUT}$ signal, based on the time constant of the low-pass filter 804, to generate a DTD signal or measurement 814. Comparator 808 compares the DTD measurement 814 to TH1, and asserts, e.g., provides a high signal, when the signal 814 is less than TH1. Otherwise, the comparator 808 is de-asserted, thereby providing a low signal. Comparator 810 compares the DTD measurement 814 to TH2, and asserts, e.g., provides a high signal, when the signal 814 is greater than TH2. Otherwise, the comparator 810 is de-asserted, thereby providing a low signal, which is inverted. The OR gate 812 de-asserts, e.g., provides a low $G_{TRIG}$ signal, when the signals out of both comparators 808 and 810 are high, indicating good data to distortion compensation circuitry. Otherwise, the OR gate 812 asserts, thereby providing a high $G_{TRIG}$ signal, indicating a pathological pattern, to gate the distortion compensation circuitry. In this example, the polarity of $G_{TRIG}$ is reversed relative to the example given in FIG. 4.

Figure 9:
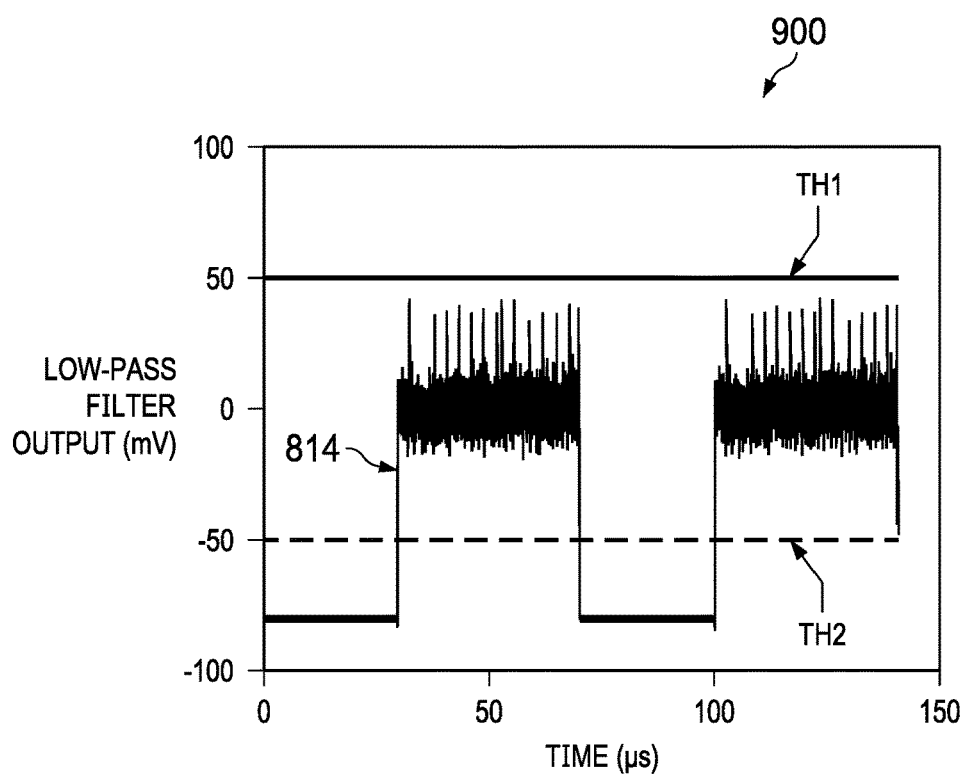
FIG. 9 depicts simulation results from operating the signal conditioning circuitry shown in FIGS. 2 and 8.

FIG. 9 depicts simulation results from operating the signal conditioning circuitry 112 and 800 shown in FIGS. 2 and 8 collectively. Shown therein is a diagram 800 depicting a waveform 814 representing the DTD measurement signal 814 plotted over time. Lines superimposed on the waveform 814, illustrate the upper threshold TH1 of 50 mV and the lower threshold TH2 of −50 mV, in this particular example. However, TH1 and TH2 can be programmed for particular applications and pathological patterns. Further, in this example, a pathological pattern is detected when the DTD measurement 814 falls to about −75 mV. Whereas, good data is detected when the DTD measurement 814 has an average of around 0V.

Figure 10:
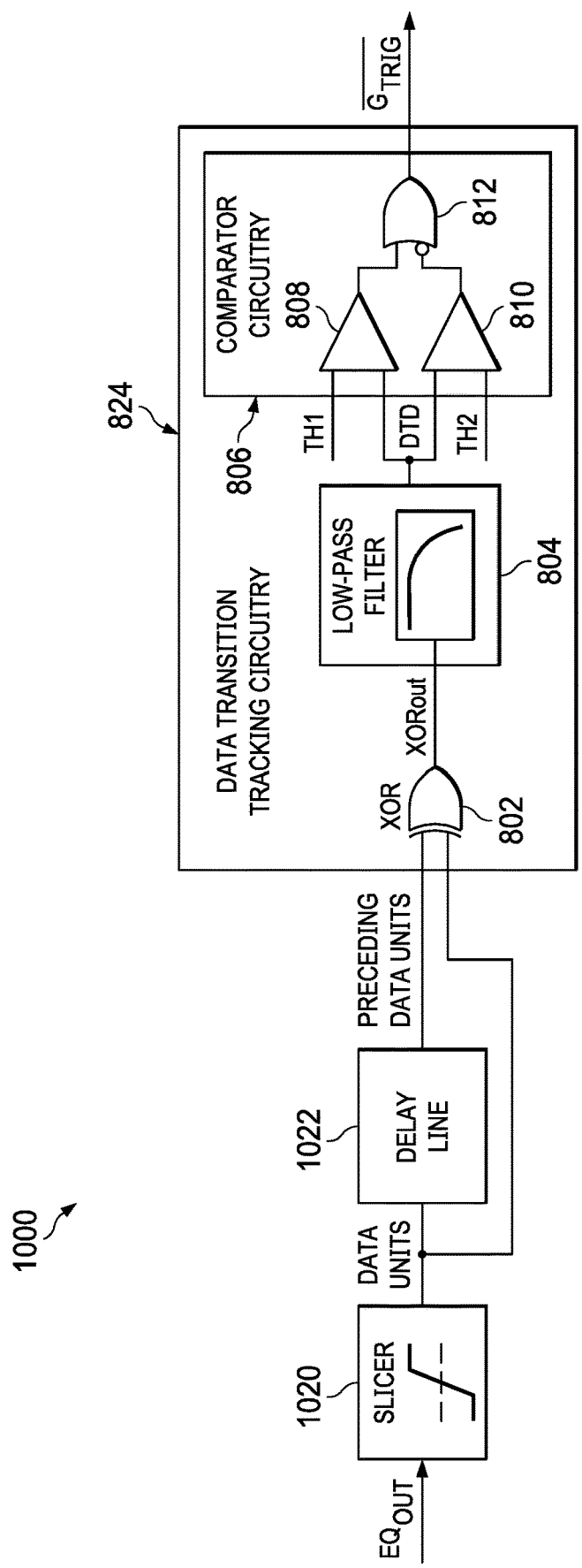
FIG. 10 depicts example signal conditioning circuitry having data transition tracking circuitry.

FIG. 10 depicts example signal conditioning circuitry 1000 having another example analog implementation of data transition tracking circuitry. Namely, circuitry 1000 includes a slicer 1020 as data unit extraction circuitry, a delay line 1022 as data unit delay circuitry, and the data transition tracking circuitry 824 (as described above by reference to FIG. 8). In this example implementation, the circuitry 1000 is used with a re-driver circuit as the distortion compensation circuitry, wherein the slicer 1020 receives an equalized signal $EQ_{OUT}$ containing data to use in generating a sequence of data units, in this case a sequence of bits. The slicer 1020 may be implemented as described above by reference to block 120 of FIG. 3.

The slicer 1020 amplifies and clips $EQ_{OUT}$ to output a "recovered" bit of data. This high speed serial data stream is provided to the delay line 1022 and to the data transition tracking circuitry 824. The delay line 1022 delays each bit in the serial data stream by 1 UI. The delay line 1022 outputs the delayed data bits, as preceding data units, to the data transition tracking circuitry 824. The data transition tracking circuitry 824 processes the data stream and the delayed data stream as described above by reference to FIG. 8 to output the $G_{TRIG}$ signal, indicating either good data or a pathological pattern, to the distortion compensation circuitry. In this example, the polarity of $G_{TRIG}$ is reversed relative to the example given in FIG. 4.

Figure 11:
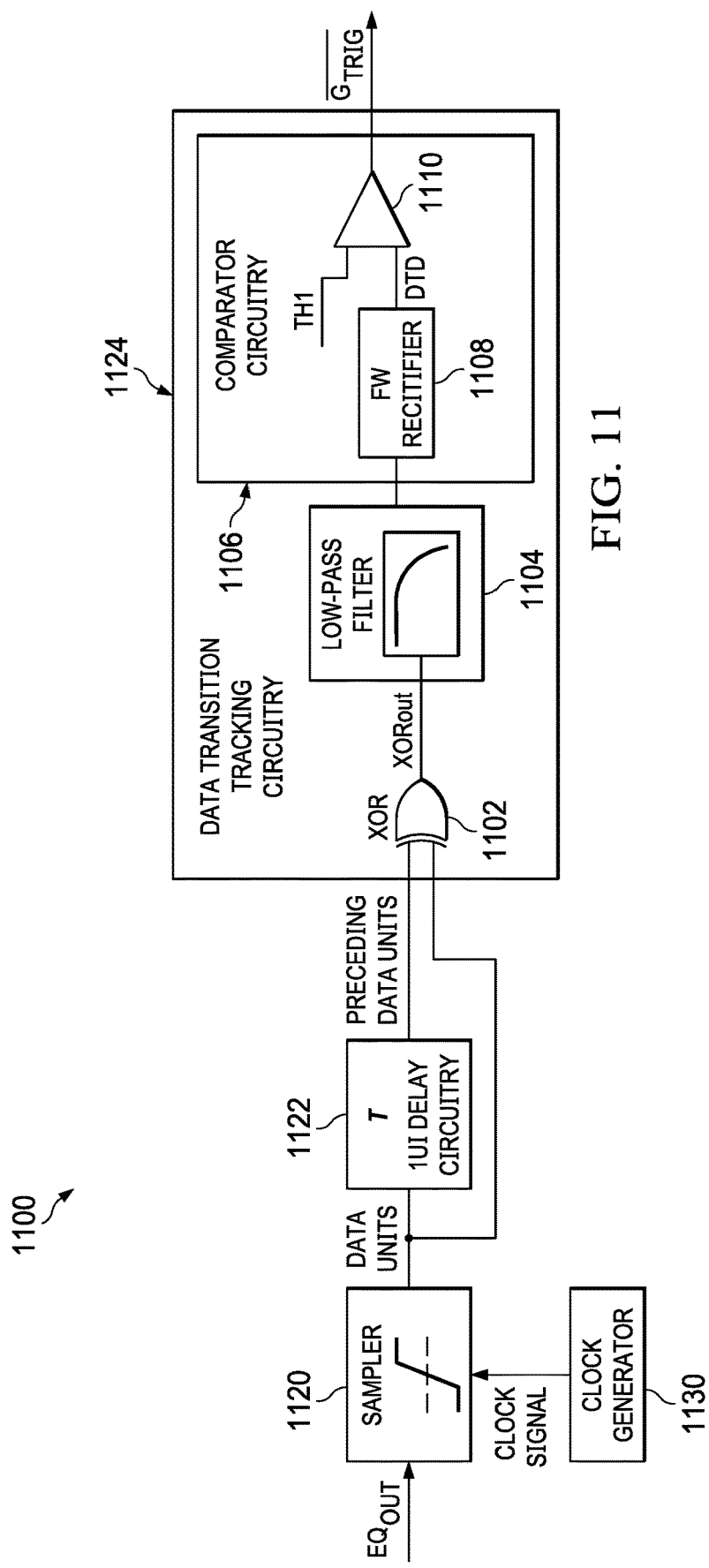
FIG. 11 depicts example signal conditioning circuitry having data transition tracking circuitry.

FIG. 11 depicts example signal conditioning circuitry 1100 having another example analog implementation of data transition tracking circuitry. Namely, circuitry 1100 includes a sampler 1120 as data unit extraction circuitry, a 1 UI delay circuitry 1122 as data unit delay circuitry, and data transition tracking circuitry 1124. In this example implementation, the circuitry 1100 is used with a re-timer circuit as the distortion compensation circuitry, wherein the sampler 1120 receives both an equalized signal $EQ_{OUT}$ containing data and a phase-aligned clock signal from a clock generator 1130 to use in generating a sequence of data units, in this case a sequence of bits. For instance, the clock generator 1130 is a local VCO within a CDR of the re-timer circuit. The sampler 1120 may be implemented as described above by reference to block 120 of FIG. 3.

Accordingly, every 1 UI or 1 period of data, the sampler 1120 samples the center of the data on the rising edge of the phase-aligned clock signal to output a new bit of data. This high speed serial data stream is provided to the delay circuitry 1122 and to the data transition tracking circuitry 1124. The delay circuitry 1122 delays each bit in the serial data stream by 1 UI. The delay circuitry 1122 outputs the delayed data bits, as preceding data units, to the data transition tracking circuitry 1124. In one example, the delay circuitry 1122 is implemented using a D flip flop.

The data transition tracking circuitry 1124 includes the analog circuitry of an XOR gate 1102, a low-pass filter 1104, and comparator circuitry 1106. The low-pass filter 1104 may be implemented as an RC circuit, having at least one resistor and one capacitor. The comparator circuitry 1106 includes a full-wave (FW) rectifier 1108 and an analog comparator 1110.

As illustrated, one input of the XOR gate 1102 is coupled to an output of the sampler 1120. The other input of the XOR gate 1102 is coupled to an output of the delay circuitry 1122. An output of the XOR gate 1102 is coupled to an input of the low-pass filter 1104. An output of the low-pass filter 1104 is coupled to an input of the FW rectifier 1108. An output of the FW rectifier 1108 is coupled to one input of the comparator 1110. Another input of the comparator 1110 is coupled to receive an upper threshold TH1. The thresholds TH1 may be programmed into a register or some other memory device (not shown) coupled to the comparator 1110. A $G_{TRIG}$ signal is provided at an output of the comparator 1110.

The XOR gate 1102 XORs each bit against a preceding bit and provides a resulting $XOR_{OUT}$ signal. The low-pass filter 1104 time-averages the $XOR_{OUT}$ signal, based on the time constant of the low-pass filter 1104, to generate a time-averaged signal. The FW rectifier 1108 rectifies any negative voltage in the time-averaged signal to a positive voltage to generate the DTD measurement. Comparator 1110 compares the DTD measurement to TH1, and asserts, e.g., provides a high $G_{TRIG}$ signal, when the DTD measurement is greater than TH1. Otherwise, the comparator 1110 is de-asserted, thereby providing a low $G_{TRIG}$ signal. A low $G_{TRIG}$ signal indicates good data to distortion compensation circuitry. A high $G_{TRIG}$ signal, indicates a pathological pattern, to gate the distortion compensation circuitry adaptation. In this example, the polarity of $G_{TRIG}$ is reversed relative to the example given in FIG. 4.

Figure 12:
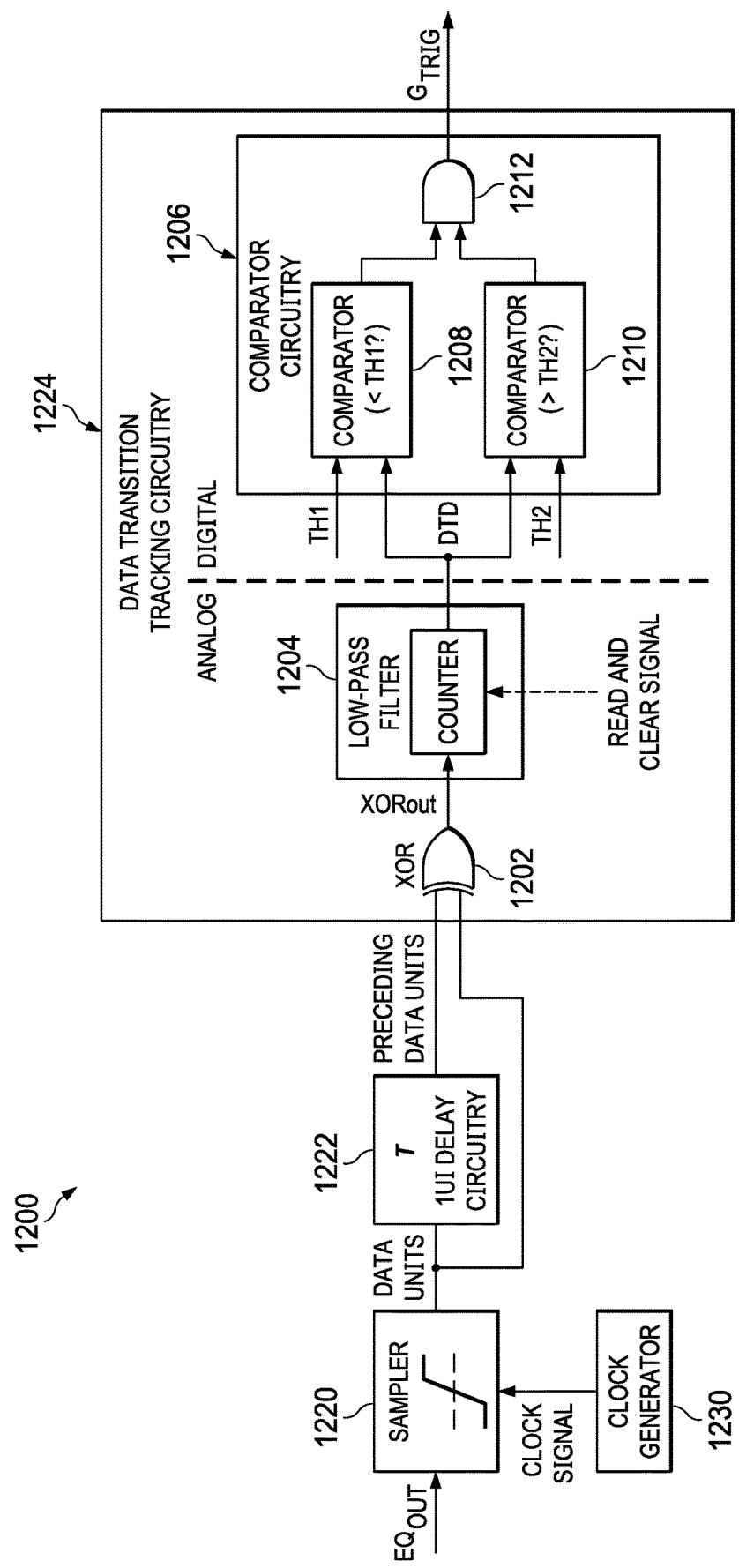
FIG. 12 depicts example signal conditioning circuitry having data transition tracking circuitry.

FIG. 12 depicts example signal conditioning circuitry 1200 having an example mixed analog and digital implementation of data transition tracking circuitry. Namely, circuitry 1200 includes a sampler 1220 as data unit extraction circuitry, a 1 UI delay circuitry 1222 as data unit delay circuitry, and data transition tracking circuitry 1224. In this example implementation, the circuitry 1200 is used with a re-timer circuit as the distortion compensation circuitry, wherein the sampler 1220 receives both an equalized signal $EQ_{OUT}$ containing data and a phase-aligned clock signal from a clock generator 1230 to use in generating a sequence of data units, in this case a sequence of bits. For instance, the clock generator 1230 is a local VCO within a CDR of the re-timer circuit. The sampler 1220 may be implemented as described above by reference to block 120 of FIG. 3.

Accordingly, every 1 UI or 1 period of data, the sampler 1220 samples the center of the data on the rising edge of the phase-aligned clock signal to output a new bit of data. This high speed serial data stream is provided to the delay circuitry 1222 and to the data transition tracking circuitry 1224. The delay circuitry 1222 delays each bit in the serial data stream by 1 UI. The delay circuitry 1222 outputs the delayed data bits, as preceding data units, to the data transition tracking circuitry 1224. In one example, the delay circuitry 1222 is implemented using a D flip flop.

The data transition tracking circuitry 1224 includes the analog circuitry of an XOR gate 1202 and a low-pass filter 1204 and digital comparator circuitry 1206. The low-pass filter 1204 is implemented as a high-speed counter, which provides an interface between the high-speed analog domain and the lower speed digital domain. The comparator circuitry 1206 includes two digital comparators 1208 and 1210 and an AND gate 1212.

As illustrated, one input of the XOR gate 1202 is coupled to an output of the sampler 1220. The other input of the XOR gate 1202 is coupled to an output of the delay circuitry 1222. An output of the XOR gate 1202 is coupled to an input of the counter 1204. An output of the counter 1204 is coupled to one input of the comparator 1208 and to one input of the comparator 1210. Another input of the comparator 1208 is coupled to receive an upper threshold TH1. Another input of the comparator 1210 is coupled to receive a lower threshold TH2. The thresholds TH1 and TH2 may be programmed into a register or some other memory device (not shown) coupled to the comparators 1208 and 1210. Outputs of the comparators 1208 and 1210 are coupled to inputs of the AND gate 1212, and a GTRIG signal is provided at an output of the AND gate 1212.

The XOR gate 1202 XORs each bit against a preceding bit and provides a resulting $XOR_{OUT}$ signal. The counter 1204 time-averages the $XOR_{OUT}$, based on the time constant of the counter 1204, to generate a DTD signal or measurement. Namely, the $XOR_{OUT}$ signal is accumulated in the counter 1204 until a read and clear signal is provided to the counter 1204. The read and clear signal causes the current accumulated sum to be output from the counter 1204 as the DTD measurement 446, and clears the counter 1204.

Comparator 1208 compares the DTD measurement to TH1, and asserts, e.g., provides a high signal (of 1), when the DTD measurement is less than TH1. Otherwise, the comparator 1208 is de-asserted, thereby providing a low signal (of 0). Comparator 1210 compares the DTD measurement to TH2, and asserts, e.g., provides a high signal (of 1), when the DTD measurement is greater than TH2. Otherwise, the comparator 1210 is de-asserted, thereby providing a low signal (of 0).

The AND gate 1212 asserts, e.g., provides a high $G_{TRIG}$ signal (of 1), when the output signals of both comparators are high, indicating "good" data, meaning the type of data that allows proper operation of the distortion compensation circuitry adaptation. Thus, the high $G_{TRIG}$ signals the distortion compensation circuitry to continue operating in an adaptive fashion. Conversely, when either or both of the output signals from the comparators are low, the AND gate 1212 is de-asserted, thereby providing a low $G_{TRIG}$ signal (of 0). A low $G_{TRIG}$ signal indicates a pathological pattern and, thereby, allows the gating of the distortion compensation circuitry. TH1 and TH2 are application specific and implementation specific. In one example, TH1 and TH2 are determined by the amount of averaging performed by the counter 1204.

Figure 13:
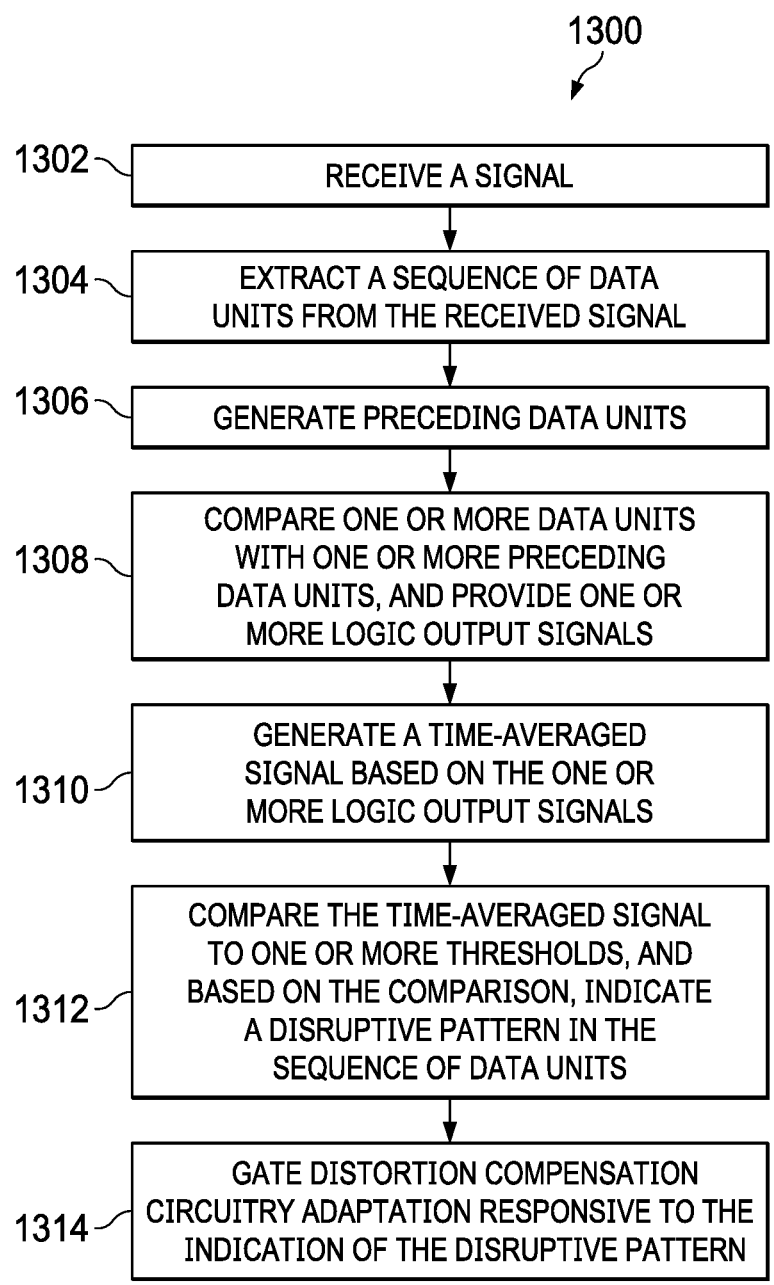
FIG. 13 depicts a flow diagram illustrating an example method of operating data transition tracking circuitry.

FIG. 13 depicts a flow diagram illustrating an example method 1300 of operating signal conditioning circuitry that includes data transition tracking circuitry. For example, the method 1300 may be implemented in the circuitry (or portions thereof) shown in one or more of FIGS. 1-4, 8, and 10-12.

According to method 1300, circuitry e.g., distortion compensation circuitry, receives a signal and extracts a sequence of data units from the signal, at blocks 1302 and 1304. For example, data unit extraction circuitry receives an equalized signal $EQ_{OUT}$ and extracts data units using a sampler in a re-timer implementation or a slicer in a re-driver implementation. The data units may be provided as $CTRL_{IN}$ to data unit delay circuitry and data transition tracking circuitry.

At block 1306, the data unit delay circuitry generates preceding data units. In one example, a flip-flop or a delay line generates one delayed datastream. In another example, a deserializer generates multiple parallel datastreams.

At block 1308, logic circuitry compares one or more data units with one or more preceding data units and provides one or more logic outputs. In one example, a single XOR gate compares data units with preceding data units from the datastream and the single delayed datastream to generate a single XOR output. In another example, an XOR bank having a plurality of XOR gates compares data units with preceding data units from the parallel datastreams and outputs multiple XOR outputs.

At block 1310, a low-pass filter generates a time-averaged signal (a DTD measurement) based on the one or more logic output signals. In one example, the low-pass filter is an analog circuit such as an RC circuit or a counter that receives the single XOR output and provides the time-averaged signal. In another example, the low-pass filter is a digital circuit that includes a summer and an integrate and dump circuit, which receives the multiple XOR outputs and provides the time-averaged signal.

At block 1312, comparator circuitry compares the time-averaged signal to a single threshold, where the comparator circuitry includes a FW rectifier, and based on the comparison, indicates a disruptive pattern in the sequence of data units. For instance the indication is a $G_{TRIG}$ signal. In another example, the comparator circuitry compares the time-averaged signal to two thresholds to generate $G_{TRIG}$. The comparator circuitry can be digital or analog circuitry.

At block 1314, at least a portion of distortion compensation circuitry, e.g., distortion compensation circuitry adaptation, is gated responsive to the indication of the disruptive pattern (e.g., $G_{TRIG}$). For example EQ adaptive control is suspended, phase-frequency adaptation in a CDR circuit is suspended, and/or the CDR circuit is reset.

The above examples are illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

What is claimed is:

1. Signal conditioning circuitry comprising:
   logic circuitry having an output, the logic circuitry configured to compare a data unit with a preceding data unit, from a sequence of data units, and provide a logic output signal;
   a low-pass filter having an input coupled to the output of the logic circuitry and having an output, the low-pass filter configured to provide a data transition density measurement for the sequence of data units responsive to the logic output signal; and
   comparator circuitry having an input coupled to the output of the low-pass filter and having an output, the comparator circuitry configured to compare the data transition density measurement to a threshold and, based on the comparison to the threshold, indicate a disruptive pattern in the sequence of data units.

2. The signal conditioning circuitry of claim 1, further comprising:
   a sampler having an output; and
   a deserializer having an input coupled to the output of the sampler and having an output coupled to the logic circuitry; and
   wherein the logic circuitry includes a plurality of exclusive OR gates coupled between the output of the deserializer and the input of the low-pass filter.

3. The signal conditioning circuitry of claim 1, wherein the logic circuitry consists of a single exclusive OR gate having first and second inputs.

4. The signal conditioning circuitry of claim 3, further comprising:
   a sampler having an output coupled to the first input; and
   delay circuitry coupled between the output of the sampler and the second input.

5. The signal conditioning circuitry of claim 3, further comprising:
   a slicer having an output coupled to the first input; and
   a delay line coupled between the output of the slicer and the second input.

6. The signal conditioning circuitry of claim 1, wherein the low-pass filter includes:
   a summer circuit coupled to the output of the logic circuitry and having an output; and
   an accumulator having an input coupled to the output of the summer circuit.

7. The signal conditioning of claim 6, wherein the low-pass filter further includes:
   a switch coupling the accumulator to the input of the comparator circuitry.

8. The signal conditioning circuitry of claim 1, further comprising:
   distortion compensation circuitry coupled to an output of the comparator circuitry, the distortion compensation circuitry configured to gate adaptive operation responsive to the indication of the disruptive pattern.

9. The signal conditioning circuitry of claim 8, wherein the distortion compensation circuitry includes an equalizer coupled to the output of the comparator circuitry.

10. The signal conditioning circuitry of claim 8, wherein the distortion compensation circuitry includes a clock and data recovery circuit coupled to the output of the comparator circuitry.

11. Signal conditioning circuitry comprising:
    data transition tracking circuitry including:
    an exclusive OR gate having an output;
    a low-pass filter having an input coupled to the output of the exclusive OR gate and having an output; and
    comparator circuitry having an input coupled to the output of the low-pass filter and having an output, wherein the comparator circuitry is configured to compare a data transition density measurement to a threshold and, based on the comparison, indicate a disruptive pattern in a sequence of data units; and
    an equalizer coupled to the output of the comparator circuitry, wherein the equalizer is configured to gate adaptive operation responsive to the indication.

12. The signal conditioning circuitry of claim 11, further comprising a clock and data recovery circuit coupled to the output of the comparator circuitry, wherein the clock and data recovery circuit is configured to gate operation responsive to the indication.

13. The signal conditioning circuitry of claim 12, wherein the clock and data recovery circuit is configured to gate adaptive operation responsive to the indication.

14. The signal conditioning circuitry of claim 11, further comprising a clock and data recovery circuit coupled to the output of the comparator circuitry, wherein the clock and data recovery circuit is configured to reset operation responsive to the indication.

15. The signal conditioning circuitry of claim 11, further comprising:
    a sampler having an output; and
    a deserializer coupled between the output of the sampler and an input of the exclusive OR gate; and
    wherein the data transition circuitry further including additional exclusive OR gates coupled between the deserializer and the low-pass filter; and
    wherein the low-pass filter includes:
    a summer circuit having inputs coupled to outputs of the exclusive OR gates and having an output;
    an accumulator having an input coupled to the output of the summer circuit, and
    a switch coupling the accumulator to the input of the comparator circuitry.

16. The signal conditioning circuitry of claim 11, the exclusive OR gate having first and second inputs, the signal conditioning circuitry further comprising:
    a sampler having an output coupled to the first input; and
    delay circuitry coupled between the output of the sampler and the second input.

17. The signal conditioning circuitry of claim 11, the exclusive OR gate having first and second inputs, the signal conditioning circuitry further comprising:
    a slicer having an output coupled to the first input; and
    a delay line coupled between the output of the slicer and the second input.

18. The signal conditioning circuitry of claim 11, wherein the comparator circuitry includes:
    a first comparator having an input coupled to the output of the low-pass filter, and having an output;
    a second comparator having an input coupled to the output the low-pass filter, and having an output; and
    a logic gate having inputs coupled to the outputs of the first and second comparators.

19. The signal conditioning circuitry of claim 18, wherein the first and second comparators are digital comparators, and the low-pass filter includes a counter coupled between the output of the exclusive OR gate and the inputs of the comparators.

20. The signal conditioning circuitry of claim 11, wherein the comparator circuitry includes:
    a comparator having an input; and
    a rectifier circuit coupled between the output of the low-pass filter and the input of the comparator.

21. A receiver including the signal conditioning circuitry of claim 11.

22. A method comprising:
comparing, a data unit with a preceding data unit, from a sequence of data units, and providing a logic output signal;
generating a time-averaged signal based on the logic output signal;
comparing the time-averaged signal to a threshold and, based on the comparison to the threshold, indicating a disruptive pattern in the sequence of data units; and
gating distortion compensation circuitry adaptation responsive to the indication of the disruptive pattern.

23. A circuit comprising:
one or more exclusive OR gates having one or more inputs and one or more outputs;
a low-pass filter having one or more inputs coupled to the one or more outputs of the one or more exclusive OR gate and having an output, the low-pass filter configured to provide a data transition density measurement for a sequence of data units at the one or more inputs of the one or more exclusive OR gates; and
comparator circuitry having an input coupled to the output of the low-pass filter, the comparator circuitry configured to compare the data transition density measurement to a threshold and indicate a disruptive pattern in the sequence of data units.

* * * * *